(12) United States Patent
Vepsäläinen et al.

(10) Patent No.: US 12,325,897 B2
(45) Date of Patent: Jun. 10, 2025

(54) APPARATUS, METHOD AND SYSTEM FOR MONITORING

(71) Applicant: COMMONWEALTH SCIENTIFIC AND INDUSTRIAL RESEARCH ORGANISATION, Australian Capital Territory (AU)

(72) Inventors: Mikko Vepsäläinen, Victoria (AU); Miao Chen, Victoria (AU); David Molenaar, Australian Capital Territory (AU); Anthony Kilpatrick, Australian Capital Territory (AU)

(73) Assignee: COMMONWEALTH SCIENTIFIC AND INDUSTRIAL RESEARCH ORGANISATION, Australian Capital Territory (AU)

( * ) Notice: Subject to any disclaimer, the term of this patent is extended or adjusted under 35 U.S.C. 154(b) by 790 days.

(21) Appl. No.: 16/340,744

(22) PCT Filed: Oct. 10, 2017

(86) PCT No.: PCT/AU2017/051095
§ 371 (c)(1),
(2) Date: Apr. 10, 2019

(87) PCT Pub. No.: WO2018/068087
PCT Pub. Date: Apr. 19, 2018

(65) Prior Publication Data
US 2021/0285071 A1 Sep. 16, 2021

(30) Foreign Application Priority Data
Oct. 10, 2016 (AU) .................. 2016904151

(51) Int. Cl.
*C22B 3/04* (2006.01)
*G01N 7/00* (2006.01)
(Continued)

(52) U.S. Cl.
CPC .................. *C22B 3/04* (2013.01); *G01N 7/00* (2013.01); *G01N 27/028* (2013.01); *G01N 27/30* (2013.01);
(Continued)

(58) Field of Classification Search
CPC ........... H04Q 2209/00; H04Q 2209/30; H04Q 2209/82; H04Q 2209/826; H04Q 2209/84;
(Continued)

(56) References Cited

U.S. PATENT DOCUMENTS

| 4,593,561 A | 6/1986 | Gavrilovic |
| 8,986,423 B2 * | 3/2015 | Lang ........................ C22B 3/04 75/375 |

(Continued)

FOREIGN PATENT DOCUMENTS

| CN | 101957456 A | 1/2011 |
| CN | 103534565 A | 1/2014 |

(Continued)

OTHER PUBLICATIONS

201900853 Resolution of Notification (and the Google Translation) dated Feb. 3, 2021.
(Continued)

*Primary Examiner* — Franklin D Balseca
(74) *Attorney, Agent, or Firm* — LADAS & PARRY LLP

(57) ABSTRACT

An apparatus system and method are provided for use in acquiring data from fluid within a region of material in a heap leaching application. The apparatus includes one or more sensor strings provided in a region of material to be analysed. Each sensor string includes a data cable and two or more solid-state sensors positioned along the length of the data cable. The sensors are adapted to periodically acquire sensor data relating to chemical properties of the fluid
(Continued)

surrounding the sensor over a predetermined period of time and to transmit the sensor data via the data cable to one or more hubs.

22 Claims, 20 Drawing Sheets

(51) Int. Cl.
*G01N 27/02* (2006.01)
*G01N 27/30* (2006.01)
*G01N 27/333* (2006.01)
*H04Q 9/00* (2006.01)

(52) U.S. Cl.
CPC ............ *G01N 27/333* (2013.01); *H04Q 9/00* (2013.01); *C02F 2201/4612* (2013.01); *H04Q 2209/30* (2013.01); *H04Q 2209/826* (2013.01)

(58) Field of Classification Search
CPC H04Q 9/00; C02F 2201/4612; G01N 27/028; G01N 27/30; G01N 27/333; G01N 7/00; C22B 3/04
See application file for complete search history.

(56) References Cited

U.S. PATENT DOCUMENTS

| | | | | |
|---|---|---|---|---|
| 10,055,903 | B2* | 8/2018 | Koons | G07C 5/08 |
| 10,057,383 | B2* | 8/2018 | Shoaib | H04L 67/12 |
| 10,079,650 | B2* | 9/2018 | Aichriedler | H04J 3/0658 |
| 11,252,305 | B2* | 2/2022 | Mitsubayashi | H04N 5/247 |
| 2003/0089623 | A1* | 5/2003 | Peat | G01N 27/38 204/422 |
| 2008/0302672 | A1* | 12/2008 | Sandvik | G01N 33/2841 204/406 |
| 2014/0056553 | A1 | 2/2014 | Villiger et al. | |
| 2020/0209180 | A1* | 7/2020 | Barton-Sweeney | G01N 33/94 |

FOREIGN PATENT DOCUMENTS

| | | | | |
|---|---|---|---|---|
| CN | 103534585 | A | 1/2014 | |
| CN | CN103534585 | A | 1/2014 | |
| WO | 2004072636 | A1 | 8/2004 | |
| WO | 2012/156203 | A | 11/2012 | |
| WO | 2012156203 | A1 | 11/2012 | |
| WO | WO-2013155075 | A1 * | 10/2013 | ............. G01N 23/06 |
| WO | 2014/039003 | | 3/2014 | |
| WO | WO-2014039003 | A1 * | 3/2014 | ............. G01K 13/10 |
| WO | 2017/030930 | | 2/2017 | |

OTHER PUBLICATIONS

201900853 Search Report (and the Google Translation) dated Feb. 3, 2021.
201900853 Expert Report (and the Google Translation) dated Feb. 3, 2021.
International Search Report in International Application No. PCT/AU2017/051095.
Written Opinion of the International Search Authority in International Application No. PCT/AU2017/051095.
CN 101957456 A _ English Translation.
Lindsay Tallon, et al., Applying Distributed Temperature Sensing to the Heap Leach Industry, (Dec. 7, 2016), URL: http://www.okc-sk.com/wp-content/uploads/2013/09/Tallon-and-OKane-2013-Applying-distributed-temperature-sensingto-the-heap-leach-industry.pdf, XP055475771 [A] * see abstract, methodology (pp. 3-6), Fig 3.
"Fiber-Optic Sensing Technologies", Halliburton, (20120000), URL: http://www.halliburton.com/public/pinnacle/contents/Brochures/web/fiber-optics.pdf, (Dec. 7, 2016), XP055475808 [A] 0 * see p. 7 *.
Chilean Search Report dated May 22, 2020 and English Translation.
Chilean Expert Report (Exam Report) dated May 22, 2020 and English Translation.
Chinese Examination 1st Report dated May 6, 2020 and English Translation.
Chinese—D2s family—WO2012156203A1.
WO2012156203A is an equivalent of CN103534585A, which is submitted herewith in English.
Examination Report—dated Mar. 12, 2021.
First Australian Examination Report dated Nov. 8, 2021 issued on counterpart Australian Patent Application No. 2017343674.
Examination Report—Rejection Decision dated Aug. 4, 2021.
Examination Report—Rejection Decision—translation dated Aug. 4, 2021.
Chile, 201900853, Resolution of Notification (and the Google Translation), Feb. 3, 2021.
Chile, 201900853, Search Report (and the Google Translation), Feb. 3, 2021.
Chile, 201900853, Expert Report (and the Google Translation), Feb. 3, 2021.
Peruvian Patent Office Examination Report issued Feb. 9, 2023.
Canadian Examination Report issued Jul. 26, 2023.
Canadian Office action dated Mar. 22, 2024.

* cited by examiner

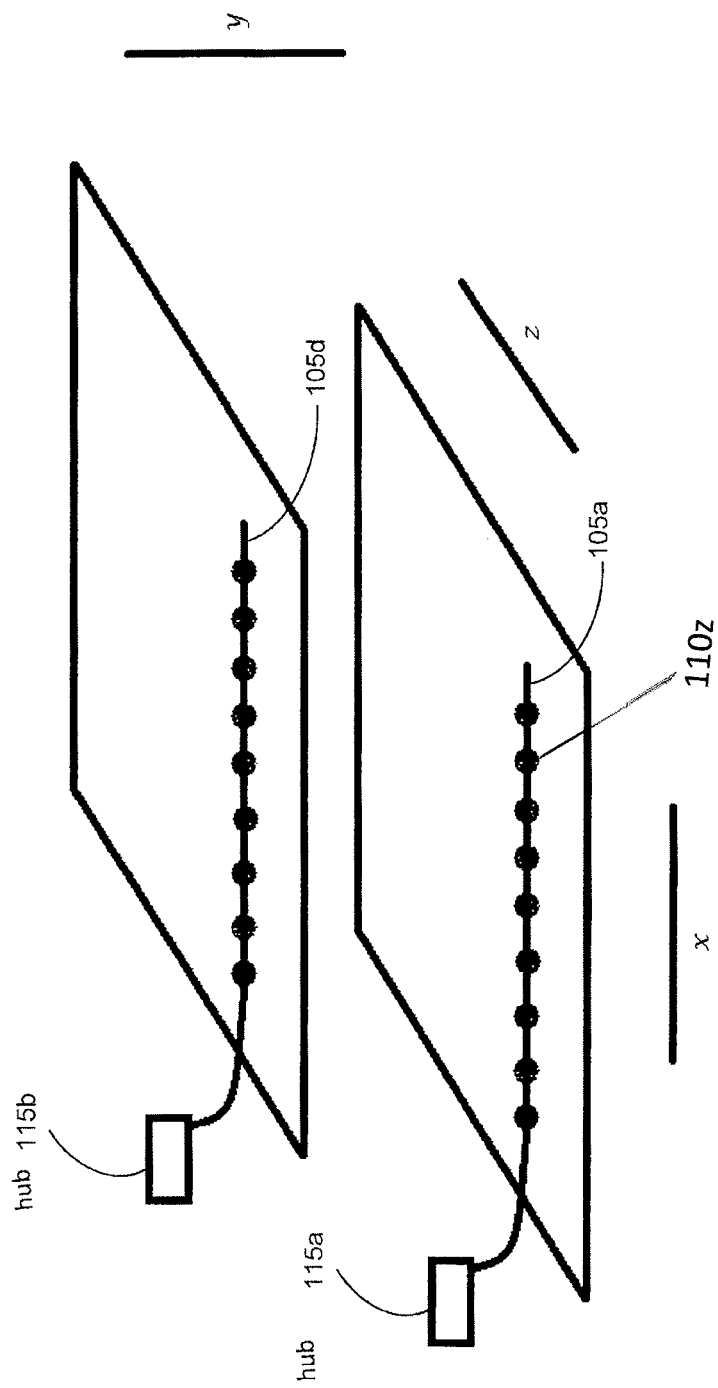

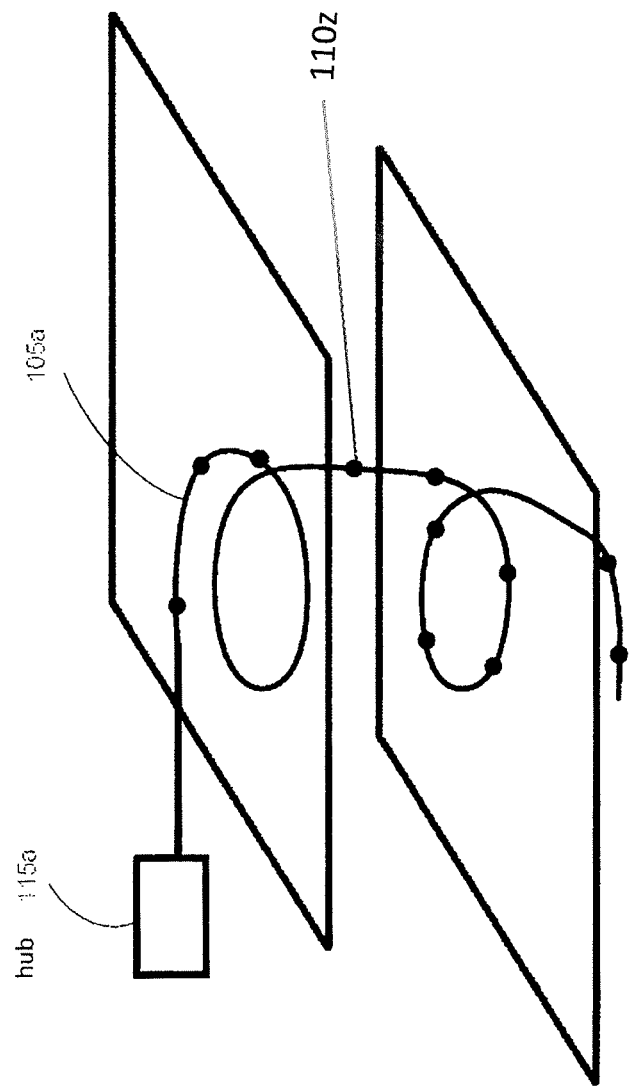

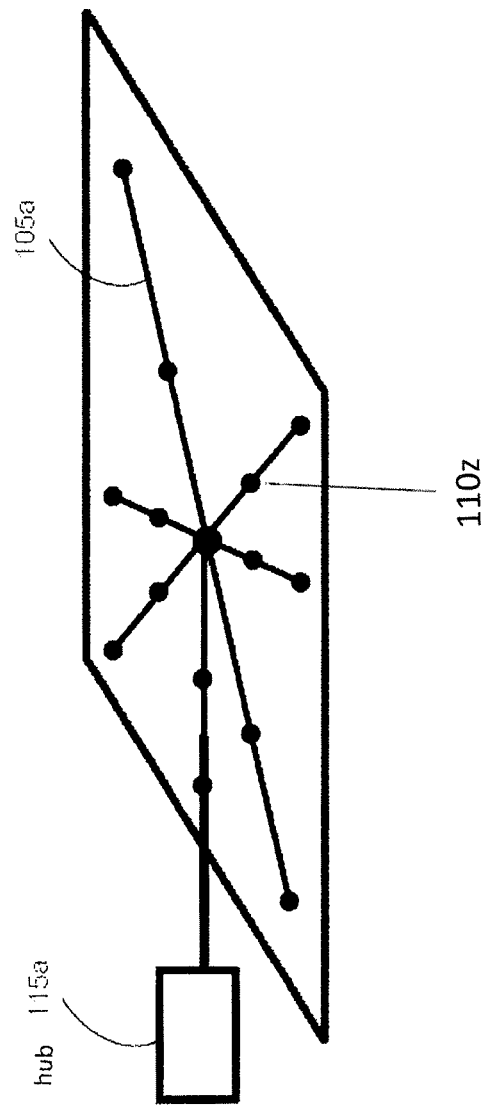

Set-up a monitoring site

Unnamed sites ☑

Unnamed sites
Site identification code 1
Site identification code 2
Site identification code 3

Name [_____] ⟵ 907

Logging frequency [____] 908  Per [Time ▾] 909
minute
hour
day

Sensor packs

Range [___] 910 - [___]  [Set-up]

Range 1 - 20    Edit    Remove
Range 21 - 50   Edit    Remove
Range 51 - 100  Edit    Remove

[Save]  [Back]  [Log out]

Site information ⟵ 911

Site code: 000001
Site name: NA
Total sensors installed: 250
Logging started 1/1/2016 01:00
Logging frequency 24 times per day

Installed packs:
1-100 version 1 DAQ module, version 1 sensor module (5 potentiometric measurements, 1 conductivity measurement, 1 temperature measurement)

Set-up:
1-20 Ch1 pH, Ch2 ORP, Ch 3 Cu, Ch4 NA, Ch 5 NA, Ch6 Conductivity, Ch7 Temperature
21-50 Ch1 pH, Ch2 NA, Ch3 NA, Ch4 NA, Ch5 NA, Ch6 Conductivity, Ch7 Temperature
51-100 Ch1 ORP, Ch2 NA, Ch3 NA, Ch4 NA, Ch5 NA, Ch6 Conductivity, Ch7 Temperature 101-250 version 1 DAQ module, version 2 sensor module (5 potentiometric measurements, 1 amperometric measurement, 1 conductivity measurement, 1 temperature measurement)

Figure 9b

Sensor packs

Range 1-20 version 1 DAQ module, version 2 sensor module (5 potentiometric measurements, 1 amperometric measurement, 1 conductivity measurement, 1 temperature measurement)

Pack information

| Pack | Name | GPS coordinates N | W | Depth | GPS tracking | In use |
|------|------|---|---|-------|--------------|--------|
| 1 | | ☐ ☐ ☐ | ☐ ☐ ☐ | ☐ | ☐ | ✓ |
| 2 | | ☐ ☐ ☐ | ☐ ☐ ☐ | ☐ | ☐ | ✓ |
| 3 | | ☐ ☐ ☐ | ☐ ☐ ☐ | ☐ | ☐ | ✓ |

912 — 917 (In use), 916 (GPS tracking), 915 (Depth), 914 (GPS coordinates), 913 (Name)

[Save and go next] [Back] [Log out]

Figure 9c

Calibration of the sensors

918

Range 1-20 version 1 DAQ module, version 2 sensor module (5 potentiometric measurements, 1 amperometric measurement, 1 conductivity measurement, 1 temperature measurement)

Sensor information
919

920 Calibration of the channel 921

| Ch | Name | Unit | Model | T correction | Terms | Processing | Alarms | Active |
|----|------|------|-------|--------------|-------|------------|--------|--------|
| 1 | | | Regression<br>Linear y=a+bx<br>Quadratic y=a+bx+cx2<br>Logarithmic y=a+blnx | Set | Set | Set | Set | ✓ |
| 2 | | | Regression<br>Linear y=a+bx<br>Quadratic y=a+bx+cx2<br>Logarithmic y=a+blnx | Set | Set | Set | Set | ✓ |
| 3 | | | Regression<br>Linear y=a+bx<br>Quadratic y=a+bx+cx2<br>Logarithmic y=a+blnx | Set | Set | Set | Set | ✓ |

922   923   924

Save   Back   Log out

Figure 9d

APPARATUS, METHOD AND SYSTEM FOR MONITORING

CROSS REFERENCE TO RELATED APPLICATION

This application is an application under 35 U.S.C. 371 of International Application No. PCT/AU2017/051095 filed on 10 Oct. 2017, which claims priority from Australian Patent Application No. 2016904151 filed on 10 Oct. 2016, the contents of which should be understood to be incorporated herein by reference.

TECHNICAL FIELD

The present application relates to spatial and temporal monitoring of material in industrial and experimental processes.

BACKGROUND OF INVENTION

Many industrial processes and water and waste water treatment operations in municipal councils require constant monitoring and control of process parameters. Many of these parameters are monitored with ex-situ and off-site laboratory analysis which is both time consuming and which can therefore introduce significant delays between sampling and analysis. This prevents real-time optimisation and control of the processes.

A further problem with ex-situ and off-site laboratory analysis (known as batch sampling) of process parameters is that it may not be accurate. For example, there is the possibility of human error or a sample change before the measurement. In addition, the cost of labour, materials and equipment to sample and run analysis is high.

Further, ex-situ and off-site laboratory analysis takes time, and there is a lag time between sampling, analysis and taking action which does not support prompt responsiveness to environmental or process issues. Further, the act of sampling itself has an impact on the process parameters since the sampling itself generally interferes with the overall system (i.e. by digging into the ground for example).

While there exists on-site and in-situ sensor technologies that enable control of some process parameters, the extreme physical and chemical environments of many of the processes (for example industrial and municipal processes) prevent many sensor technologies from being used and limit the types of parameters that may be measured.

A further problem is that the continuous optimisation of process parameters in extreme physical and chemical environments is not possible since sensors cannot be reliably used in harsh environments for any useful period of time (without breakdown or requiring recalibration) to provide process optimisation.

Further, highly detailed measurements in real-time are impractical and/or uneconomical for some experimental tests because of the extreme physical and chemical environments.

The discussion of the background to the invention included herein including reference to documents, acts, materials, devices, articles and the like is included to explain the context of the present invention. This is not to be taken as an admission or a suggestion that any of the material referred to was published, known or part of the common general knowledge in Australia or in any other country as at the priority date of any of the claims.

SUMMARY OF INVENTION

According to a first aspect, the present invention provides an apparatus for use in acquiring data from a fluid within a region of material in a heap leaching application, the apparatus including: one or more sensor strings provided in a region of material to be analysed, each sensor string including a data cable and two or more solid-state sensors positioned along the length of the data cable, the sensors adapted to periodically acquire sensor data relating to chemical properties of the fluid surrounding the sensor over a predetermined period of time and to transmit the sensor data via the data cable to one or more hubs.

Advantageously the present invention allows for fluid within a region of material to be analysed via one or more sensor strings provided in the material and the sensors may be left in the material and provide data relating to the material over time. It will be appreciated that the material may include a volume of earth, a volume of material in a heap leaching application.

A heap leaching application may include a heap leach or a system for simulating a heap leach such as a crib or column arrangement. In a heap leaching application, ore is mined and crushed before being placed on a lined pad.

The ore is then irrigated with a lixiviant to provide leachate which is then collected in a pond or tank. Depending on the ore, the location of the leach, the environmental conditions and the like, a number of parameters within the heap leach will dictate the effectiveness of the heap leach, the amount of consumables used in the heap leach and the like. Cribs and column arrangements are utilised to model large scale heap leach applications and presently analysis of cribs and column arrangements are limited to determining parameters after the leachate has been extracted and sits at the bottom of the crib or column—and provides no insight into the operation of the heap leach in-situ and in real time so that, for example, one or more parameters of the heap leach may be changed to improve operation.

In a further advantage, the present invention determines chemical properties of a fluid within a region of material over time, which then allows for chemical parameters to be adjusted in the material which in turn, can improve extraction of metals from ore (for example). Physical parameters may also be adjusted such as irrigation drip rate, oxidation flow rate and the like.

Advantageously, the present invention allows for continuous monitoring of bioleaching processes and enables spatial monitoring of bioleaching heaps. The present invention may also be applied to smaller scale heap leach applications such as tank and crib leaching. The present invention provides continuous spatial monitoring over time of leaching heaps and their chemical parameters. This, in turn, allows for real-time control of parameters in the heap leach, for example temperature, chemical parameters, chemical concentrations (acid, for example), air flow, liquid flow, aeration, spacing for irrigation and the like. Advantageously, real-time control of these parameters allows for improved leaching recovery and efficiency as well as a reduction in consumables (i.e. the materials used in leaching).

Preferably, the two or more solid-state sensors are one or more of potentiometric sensors, amperometric sensors, coulometric sensors, impedimetric sensors and voltammetric sensors. The solid-state sensor may be a wide-band semiconductor chemical sensor.

The two or more solid-state sensors are preferably adapted to provide an output data or data representative of chemical properties of the fluid surrounding the sensor, the chemical properties including one or more of oxidation/reduction potential (ORP), dissolved metal ions, dissolved Oxygen, dissolved $CO_2$, dissolved $H_2S$; and/or the concentrations, molarities, potentials or partial pressures of chemical species of interest, or other observable physical or chemical phenomena to transmit an output data to the hub.

The two or more solid-state sensors are further preferably adapted to provide an output data or data representative of a change over a predetermined time period in chemical properties of the fluid surrounding the sensor. The chemical properties including one or more of oxidation/reduction potential (ORP), dissolved metal ions, dissolved Oxygen, dissolved $CO_2$, dissolved $H_2S$; and/or the concentrations, molarities, potentials or partial pressures of chemical species of interest, or other observable physical or chemical phenomena over a predetermined time period to transmit output data to the hub.

In an embodiment the present invention allows for pH to be measured by way of solid-state sensors. Typical pH sensors are ion-selective "glass electrodes which often have an internal reference electrode. Glass pH electrodes have high impedance and require special electronic devices to log the signal-they also suffer from alkali error in a high pH environment and acidic error when pH is very low. They are also fragile and require constant calibration due to drift and instability. Further, some solid-state sensors such as ISFET sensors also suffer from drift and hysteresis effects and are sensitive to light.

The solid-state pH sensor may take any form, and may be for example like the type described in the applicant's patent application for Metal Oxide pH sensor U.S. Ser. No. 15/507,580

Advantageously, the present invention utilises solid-state sensors and in particular, wide-bandgap semiconductor sensors to provide resistance to chemicals (while at the same time having the ability to measure aspects of said chemicals) and functional operation at extreme temperatures.

Preferably, one or more reference electrodes are also included. The reference electrodes may be solid-state reference electrodes. The reference electrode may be utilised in combination with the one or more sensors for electrochemical measurements. Preferably, for measuring PH levels, at least one or reference electrodes is provided and in particular a solid-state reference electrode.

A reference electrode in extreme environments must be stable and provide an accurate electrode potential. Typical reference electrodes are Ag/AgCl, saturated calomel electrode (SCE). These electrodes are filled with liquid or gel with a known salt concentration. The reference electrode is in contact with the solution through a vycor tip or other porous material. A problem with typical reference electrodes is that salts in the liquid or gel will slowly diffuse through the tip and eventually the salt concentration changes which causes a shift of the reference potential which then affects the electrochemical measurements.

Even many solid state reference electrodes have stability issues of the electrode signal (in extreme environments) as well as having high impedance.

The present invention may utilise any suitable solid-state reference electrode having adequate chemical stability, acid resistance, thermal stability and mechanical stability. The solid-state reference electrode may take any form, and may be for example like the type described in the applicants patent application for reference electrodes PCT/AU2018/050412

In an embodiment, the one or more sensors are associated with a solid state reference electrode. Preferably, the one or more sensors acquire sensor data relating to chemical properties simultaneously or alternatively, by way of by way of time-division multiplexing.

Advantageously, having multiple commonly-referenced sensors allows the ability to deploy a multi-sensor system into heap leaching applications such as tanks and cribs (for testing) before being applied to a heap leach itself. The present invention can thereby manage the chemical operation of the heap leaching application by interpreting multiple parameter readings of localised behaviour of the heap leach arrangement.

Collecting data over time collected from spatially, temporally and electrically correlated sensors allows for the improved ability to improve process control. The richness and accuracy of the sensor data enables effective application of multi-parameter optimisation of the heap leach application.

It will be appreciated that the sensor strings may be provided in a two-dimensional spatial arrangement. The two-dimensional spatial arrangement may include an array, net or web, circle, spiral or the like.

It will be appreciated that the sensor strings may be provided in a three-dimensional spatial arrangement. The three-dimensional spatial arrangement may include a helical shape, parallelepiped, sphere or the like. The sensor strings may also be provided in a random distribution.

It will further be appreciated that the two or more sensor strings may be provided in a first plane, a second plane, both a first and second plane, a third plane or a combination thereof thereby providing analysis of the fluid within a region of material in three dimensions.

The first, second and/or third plane may be perpendicular to each other or randomly placed.

Preferably the two or more solid-state sensors are adapted to emit data which describes observations of one or more physical phenomena such as total pressure, flow rate, humidity, electrical resistance, electrical conductivity, permittivity, temperature or other observable physical phenomena which may be transmitted to the hub.

It will be appreciated that the sensors may take any suitable form depending on the physical and/or chemical phenomena to be measured, for example ion-selective electrodes, voltammetry electrodes, amperometric sensors, such as dissolved oxygen and sulphide sensors, spectroscopic techniques, such as Fourier transform infrared (FTIR) spectroscopy.

The two or more solid-state sensors may also emit data representative of a change in one or more of conductivity or temperature over a predetermined time period to transmit output data for the hub. The sensors may monitor the change of parameters time periods in the order of minutes (but for many data requirements, it is only necessary to report the data every few hours). The time period may be continuous.

The output data from a sensor may further include sensor location ID, a unique sensor ID, locational co-ordinates (example GPS co-ordinates, Cartesian co-ordinates, any other co-ordinate system), and a timestamp. According to a second aspect, the present invention provides a method of acquiring data from fluid within a region of material to be analysed, the method including: providing one or more sensor strings in an region of material to be analysed, each sensor string including a data cable and two or more solid-state sensors positioned along the length of the data cable, the sensors adapted to periodically acquire sensor data relating to chemical properties of the fluid surrounding the sensor over a predetermined period of time and to transmit the sensor data via the data cable to one or more hubs.

According to a third aspect, the present invention provides a method of acquiring data from fluid within a region of material to be analysed, the method including: digging a trench in the material to be analysed, providing one or more sensor strings in the trench, each sensor string including a data cable and two or more solid-state sensors positioned along the length of the data cable, the sensors adapted to periodically acquire sensor data relating to chemical properties of the fluid surrounding the sensor over a predetermined period of time and to transmit the sensor data via the data cable to one or more hubs.

Advantageously, the method of the present invention may be provided in digging a trench where the material in the trench, in particular earth or ore, may be analysed in the environment (for example, waste water for example in a suburban setting where an operator will provide a trench to access a pipe or the like). The sensor string(s) may be provided in the trench so that once the trench has been backfilled, data can be provided relating to the fluid within a volume of material surrounding the sensors over time and in a 2D or 3D configuration to provide data in relation to the operation of the system.

According to a fourth aspect, the present invention provides a method of controlling operation of a leach process comprising: a) forming a leachable region having one or more heap layers/dumps; b) providing one or more sensor strings within the one or more layers/dumps, each sensor string including a data cable and two or more solid-state sensors positioned along the length of the data cable, the sensors adapted to periodically acquire sensor data relating to chemical properties of the fluid in the layers/dumps over a predetermined period of time and to transmit the sensor data via the data cable to one or more hubs thereby providing sensor data relating to the leach process, c) modelling the leach process using the sensor data; and d) adjusting the leach process operation based on the sensor data.

Advantageously, the method of controlling operation of the leaching process allows for the sensor strings to be provided in one or more of the layers/dumps in a two-dimensional or three-dimensional configuration, thereby providing sensor data to the leach process at any plane or region within the process, and also providing data in relation to the leach process as a whole to allow for adjustment of process parameters. Operating parameters may include for example temperature, chemical parameters, chemical concentrations (acid, for example), air flow, liquid flow, aeration, spacing for irrigation and the like. Advantageously, control of these parameters allows for improved leaching recovery and efficiency as well as a reduction in consumables (i.e. the materials used in leaching).

It will be appreciated that the sensor string may be provided between the one or more heap lift layers or within the heap lift layer, for example, in a heap leaching application.

It will be appreciated that the sensor string may be provided between one or more depths, for example, in an in-situ leaching well.

It will be appreciated that the sensor string may be provided between the one or more dumps or within a dump, for example, in a dump leaching application.

It will be appreciated that the sensor string may be provided in a smaller scale heap leach application for testing such as tank and crib leaching.

According to a fifth aspect, the present invention provides a system for controlling operation of a leach process comprising: a) a leachable region having one or more layers/dumps; b) one or more sensor strings provided in the one or more layers/dumps, each sensor string including a data cable and two or more solid-state sensors positioned along the length of the data cable, the sensors adapted to periodically acquire sensor data relating to chemical properties of the fluid in the leaching process over a predetermined period of time and to transmit the sensor data via the data cable to one or more hubs thereby providing sensor data relating to the leach process, and c) a computer processor for: i. modelling the leach process using the sensor data; and ii. adjusting the leach process based on the sensor data.

The analysis of the fluid within the volume of material may be in two dimensions and/or in three dimensions. The sensor strings may be parallel to one and other, but need not be parallel, and may be provided for example within layers of a heap leach for example.

The density distribution of the sensors and strings may be held regular, or may vary across the leaching process, to provide greater or lesser process parameter density as required for the application.

BRIEF DESCRIPTION OF DRAWINGS

FIGS. 3a to 3f are preferred embodiments of arrangements of the sensor strings within the material to be analysed;

FIGS. 9a to 9g are screen shots of an exemplary embodiment of the system in operation;

DETAILED DESCRIPTION

Figure 1:
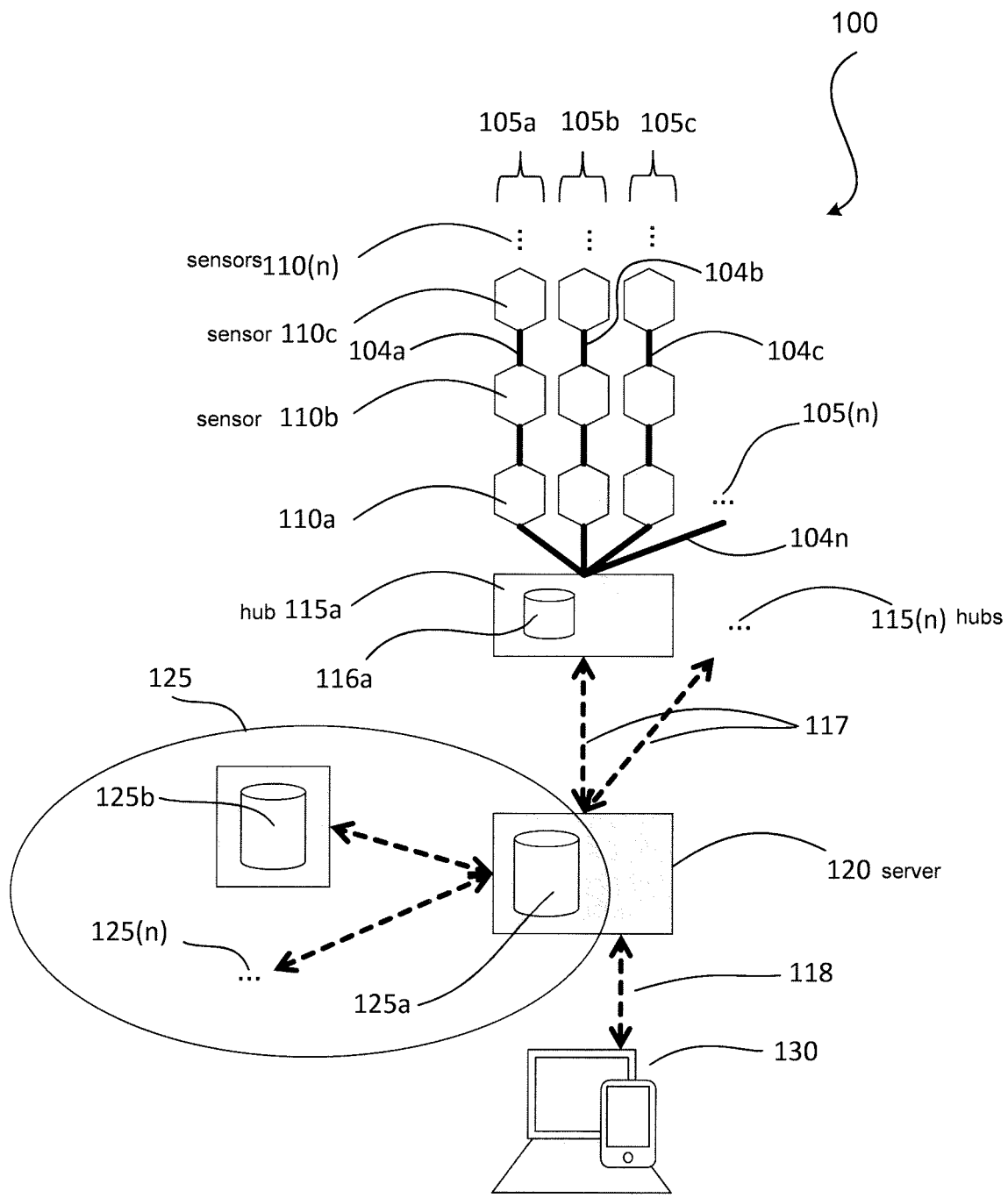
FIG. 1 is a schematic diagram illustrating the system of the present invention.

FIG. 1 is a schematic diagram which illustrates the system 100 of the present invention for acquiring data from a fluid within a volume of material of material to be analysed. The system includes one or more sensor strings 105a, 105b, 105c-105(n) each including two or more sensors 110a and 110b, 110c-110(n) attached to data cable 104a, 104b, 104c-104(n) that provide power and data connectivity. Each sensor string 105a, 105b, 105c-105(n) is connected to a hub 115a-115(n). Each hub 115a-115(n) communicates via a wired or wireless network interface with a server 120 which includes a database 125 for storing data received from the sensors 110a-110(n) of each sensor string 105a-105(n) along data cable 104a-104(n). An end user associated with user interface via a device 130 may interact with the data received from the sensors via data server 120 via a network. The device 130 may take any suitable form such as a computer, mobile communication device, tablet or the like. It will be appreciated that the hub may in alternative embodiments be a gateway or a data logger.

It will be appreciated that depending on the application, tens, hundreds or thousands of sensors 110a, 110b, 110c-110(n) may be provided. The data cables 104a, 104b, 104c-104(n) act to transfer data acquired from the sensors 110a, 110b, 110c-110(n) and to transfer power from the hubs 115a-115(n) to the sensors 110a, 110b, 110c-110(n). Hubs 115a-115(n) may read any number of data cable (for example, 25 data cables) per hub and act to cache the data received from the sensors 110a, 110b, 110c-110(n) in an on-board database 116a and to periodically upload the data to the server 120 via a network. The network may include the internet for example or a local area network. The transfer may be carried out in any suitable manner such as Wi-Fi, 3G, 4G or satellite and the like, using any suitable protocol and data format. Each hub 115a-115(n) may initiate a connection to the server 120 and 'push' data, or the server 120 may initiate a connection to each hub 115a-115(n) and 'pull' data.

The server 120 may receive data from the hubs 115a-115(n) and store the data for retrieval in a database 125a. The data may be further processed on the server 120 or in a database 125b to 125(n) which is in a geographically redundant location. Additionally, geographic redundancy of the servers may be provided which allows a gateway to fail-over to a secondary or tertiary server if one is unreachable. A user associated with device 130 may, if authorised, and depending on their role, access the data on the server 120 and database 125 and may acquire visualisation and analysis of the data in a preferred format. This will be described further with reference to FIGS. 9a-9g.

Figure 3A:
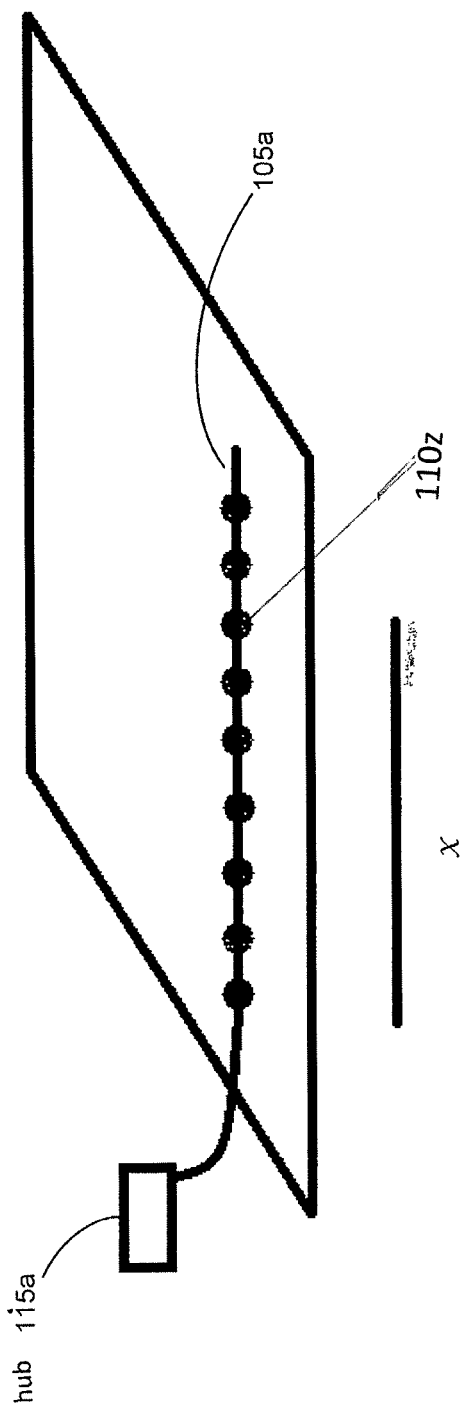
Figure 3B:
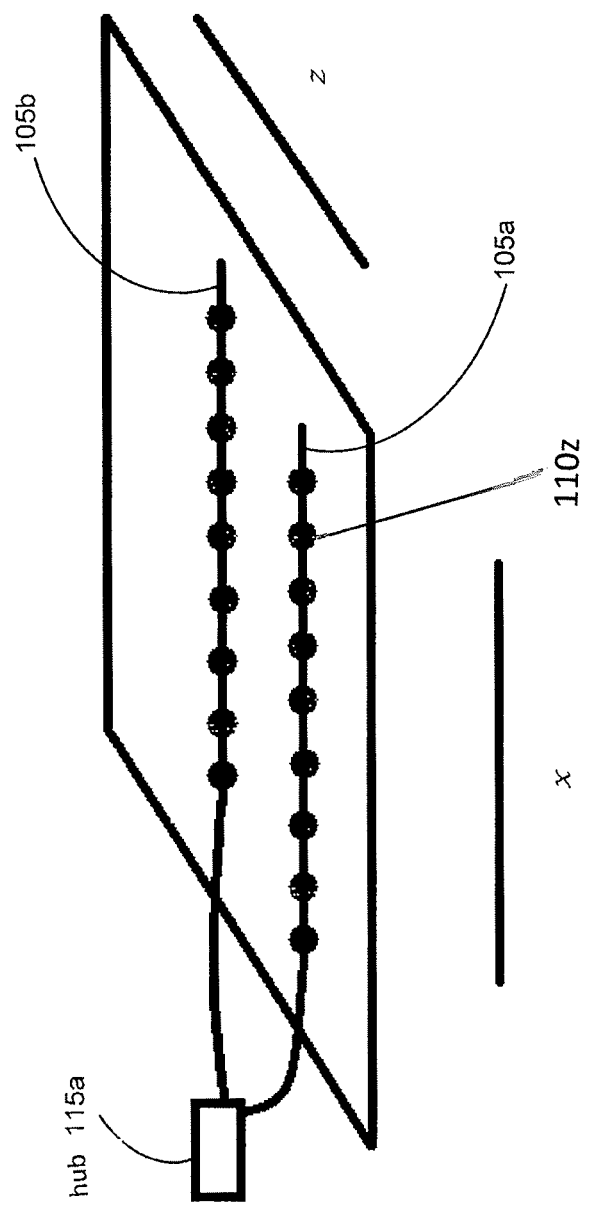
Figure 3C:
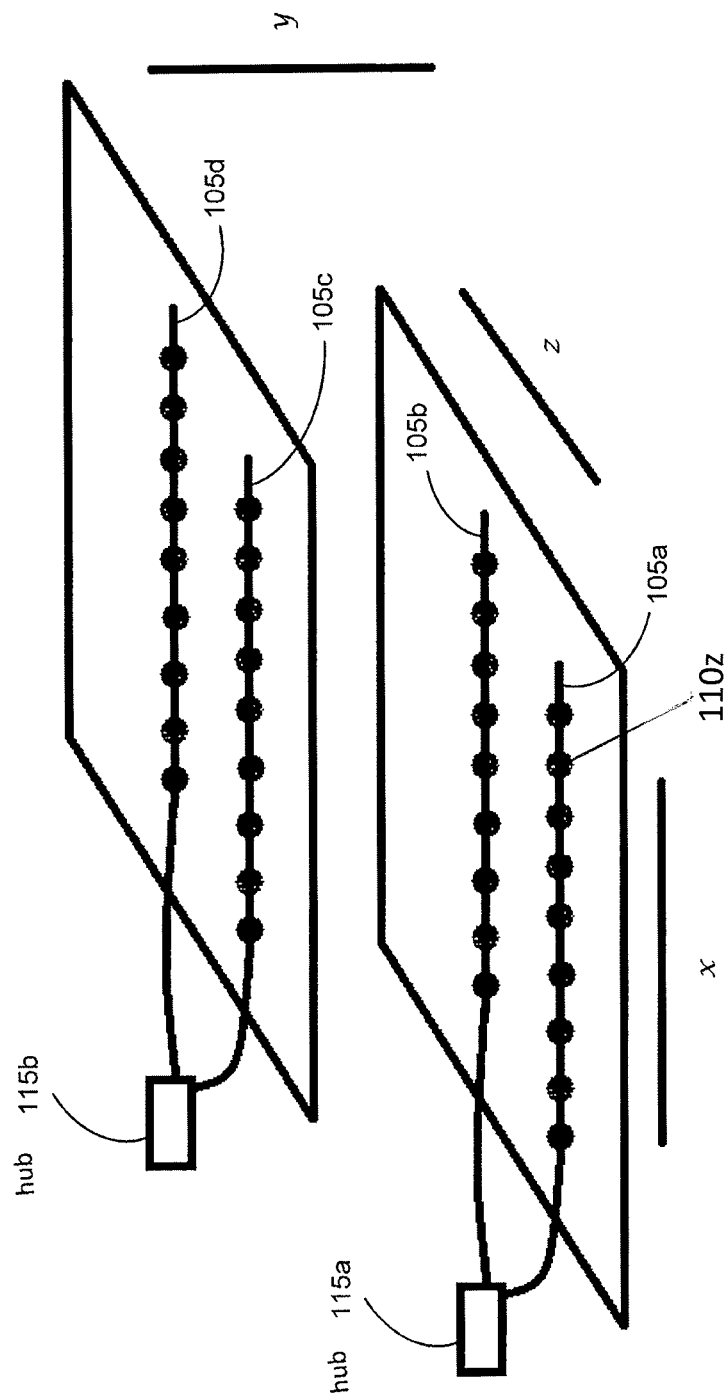

It will be appreciated that the sensors 110a, 110b, 110c-110(n) may be provided in two dimensional or three-dimensional spatial arrangements (such as nets, or matrices or helical arrangements) or in one or more horizontal or vertical planes within a region of material to be analysed. Advantageously, this provides spatial information about parameters in the region of material to be analysed. A higher number of sensors may be provided within a particular region of material to be analysed. This will be described further with reference to FIG. 3. The system is also not limited to any particular application although it may be used in a leach operation for example.

The sensors 110a, 110b, 110c-110(n) may include an electronics module which incorporates a protective casing, power regulator for the transducers, high-impedance transducer signal conditioning, analogue to digital converter (ADC), microcontroller, metadata storage and bus physical layer (PHY) interface and the like to measure one or more parameters from the material surrounding the sensor. The parameters that may be measured will depend upon the application but may include, for example, pH (mV), oxidisation-reduction potential (ORP) (mV), reference electrode conductivity (4 point impedance), temperature or the like.

The casing of the sensor 110a, 110b, 110c-110(n) is preferably made from a suitable acid resistant plastic, such as PMMA or suitable epoxy, and the solid-state sensors are preferably mounted into the casing using an acid resistant polymer. The solid-state sensors may be wide-bandgap semiconductor sensors to provide resistance to chemicals (while at the same time having the ability to measure aspects of said chemicals) and functional operation at extreme temperatures. Advantageously, when placed in a heap leach operation for example, the solid-state sensors do not require calibration/re-calibration and require little to no maintenance-obviating the need to drill holes in the leach to sample or to re-calibrate the sensors. Use of the solid-state sensors allows for a "set-and-forget" arrangement. Preferably, the sensors 110a, 110b, 110c-110(n) include a quick connector that fits into the electronics module. Preferably, the sensors 110a, 110b, 110c-110(n) are ingress protection rated IP68 to a sufficient pressure or depth underwater.

The sensors 110a, 110b, 110c-110(n) are wired together via use of a data cables 104a, 104b, 104c-104(n) to form sensor strings 105a, 105b, 105c-105(n), allowing power transfer and digital data transfer between the hub 115a-115(n) and the sensors 110a, 110b, 110c-110(n). Preferably, each of the sensors 110a, 110b, 110c-110(n) include non-volatile storage for its unique metadata. Prior to deployment, an operator may calibrate a sensor string 105a, 105b, 105c-105(n) against reference parameters and program metadata (including transducer drive parameters, ADC gains, calibration coefficients and locational coordinates) into the sensors 110a, 110b, 110c-110(n). This will be further described with reference to FIGS. 9a to 9g.

The metadata that may be stored on the electronics module within the sensors 110a, 110b, 110c-110(n) may include: sensor module model/variant ID, unique serial number, transducer drive parameters (e.g. excitation voltages or currents, ADC gains, oversampling factors), coefficients for conversion of raw ADC values or potentials into calibrated physical units, sequence along the sensor string, physical distance between the sensor and a marked datum on the sensor string, calibration date/time (UTC), locational coordinates, and a cyclic redundancy check (CRC) or hash of the foregoing metadata for verification purposes.

The electronics module controls power output to the sensors, signal conditioning and digitisation, correction & unit conversion, and communicates data to the hubs 115a-115(n) over the sensor strings. Preferably, the basic data processing will be carried out in the sensors, for example: oversample averaging and calculating the standard deviation of the signal over the sampling time, current and voltage data of the conductivity sensor is processed into the resistance values, resistance values of the temperature sensors, millivolt readings of the potentiometric sensors, simultaneous correction & conversion to real-world units, from stored calibration coefficients.

Preferably, the hubs 115a-115(n) include the capability to re-write metadata and re-program the embedded firmware on attached sensors, when instructed to do so by an authorised administrator user through the user interface via a device 130 or the like.

A full potentiostat may also be provided in the sensors 110a, 110b, 110c-110(n). The potentiostat having a suitable electrochemical impedance spectroscopy (EIS) capability.

In environmental monitoring applications, each sensor 110a, 110b, 110c-110(n) may have its own wireless or mobile data transfer capability and battery power.

Figure 2:
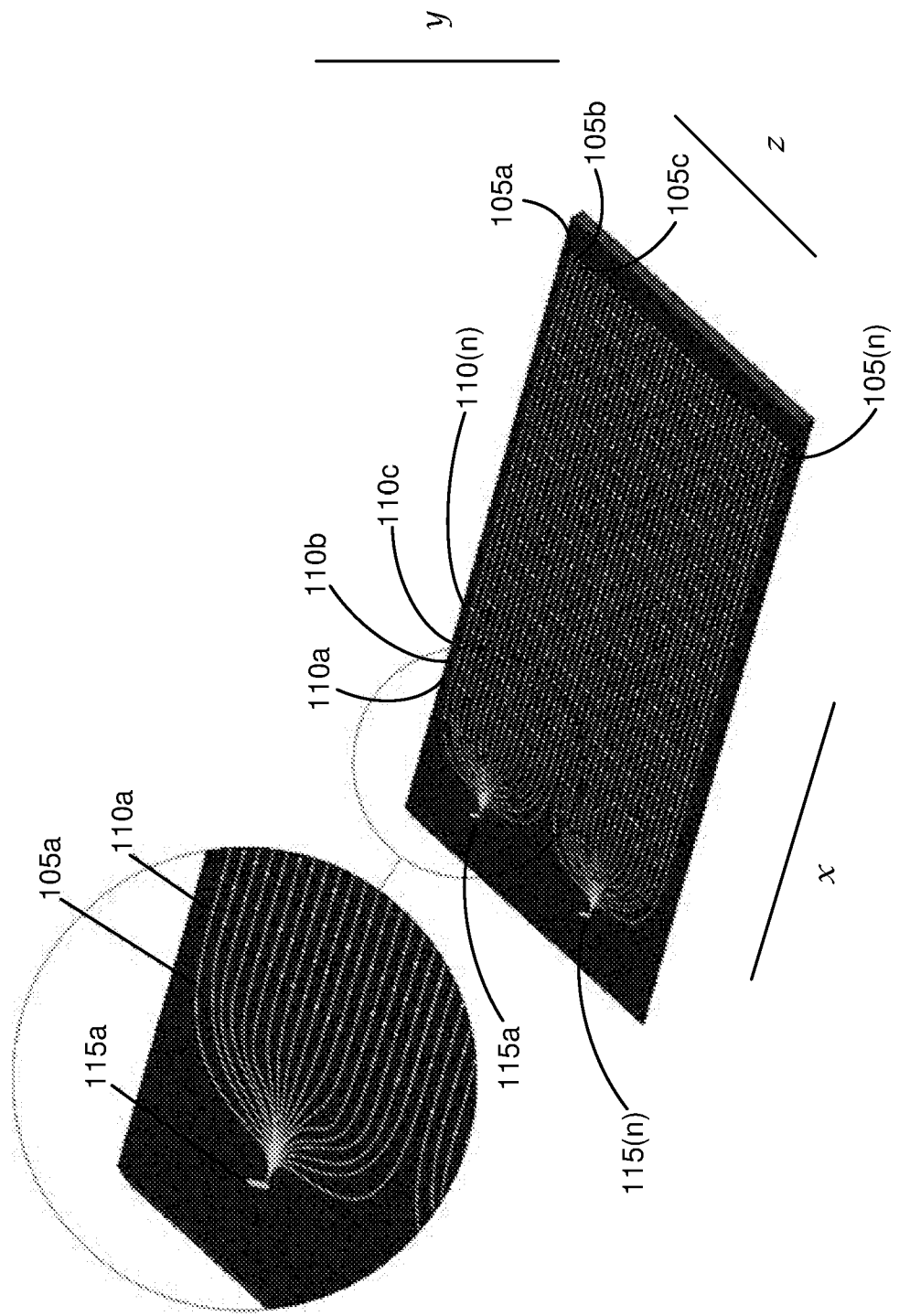
FIG. 2 is a schematic diagram illustrating the sensor string and hub operation.

FIG. 2 is a schematic diagram illustrating the sensor strings 105a, 105b, 105c-105(n) having sensors 110a, 110b, 110c-110(n). It will be appreciated that the strings may be provided along a plane denoted x and/or along a plane denoted z and/or further along a plane y as will be further shown with reference to FIG. 3. It will be appreciated that the sensor strings may be provided in two-dimensional spatial arrangements or three-dimensional spatial arrangements such as circular, spiral, zig-zag, and the like.

The hubs 115a-115(n) in this instance control forty sensor strings each and the hub connects to the data server 120 by Wi-Fi, 3G, 4G or satellite network depending on what is required in the particular deployment location. Each hub 115a-115(n) is provided with internal memory and may store 14 or more days of data from the sensor strings (in the event that there is an issue with the connection). The hub 115a-115(n) may also include a Global Navigation Satellite System (GNSS) receiver to synchronise its clock and verify its physical location. Data and events received from the sensors 110a, 110b, 110c-110(n) are preferably timestamped. The hubs 115a-115(n) periodically indicate to the server 120 data via telemetry, the data including, for example, uptime, power supply values and storage available, error data, warning data, informational messages or codes, communication, media information (e.g. RSSI, SINR, RSRQ, etc), any events of sensor string to hub connection or disconnection events including which physical connector on a hub the string sensor is connected to, providing sensor unit metadata for all connected sensor strings and measured sensor data.

It will be appreciated that the data server 120 may provide to the hub 115a-115(n) the time at the server, sensor sample intervals for the hub and new telemetry session intervals for the hub. Preferably, sensors 110a, 110b, 110c-110(n) may be measured at 10 minute intervals and data uploaded to the server 120 every 60 minutes. Advantageously, together with the placement of the sensor strings, this provides measurements of data both of the fluid within a volume of material in a number of dimensions over a period of time as will be further described with reference to FIGS. 9a to 9g.

Preferably the communication protocol between the hub 115a-115(n) and the data server 120 is a standard as such as Message Queuing Telemetry Transport (MQTT), a machine to machine connectivity protocol or the like. It will be appreciated that alternatives such as XMPP and CoAP may be provided. The data provided by the sensors and made available ultimately to the user via a device 130 may include data of observation, sufficient information to unambiguously describe the sensor unit (i.e. the site, the hub and string references relevant to the sensor unit metadata) and for each transducer and oversample average ADC raw value, standard deviation of oversample values and a physical unit value derived from raw value by calibration coefficients.

The data stored at the data server 120 made available to the user using a device 130 may be provided in dashboard format as will be further described with reference to FIGS. 9a to 9g.

FIGS. 3a to 3f illustrate alternative arrangements for the sensor strings 105a, 105b, 105c-105n and hubs 115a-115(n) The dark circles on each of lines 105a, 105b, 105c-105n represent sensors at least one of which, for example 110z, is associated with or contains a reference electrode. For example in FIG. 3a it will be apparent that one sensor string 105a may be provided in the plane denoted by x whereas in FIG. 3b sensor strings 1-5a, 105b may be provided in the plane denoted by x and z, whereas in FIG. 3c sensor strings 105a and 105b may be connected to hub 115a and provided in a plane denoted by x and z and further including sensor strings 105c and 105d in a further plane y and connected via hub 115b.

In contrast, as shown in FIG. 3d, two sensor strings 105a and 105b may be connected to hubs 115a and 115b and may be provided in a plane denoted by x, and y. It will be appreciated that any number of different combinations may be provided depending on the application and depending on what is to be measured.

In a further embodiment, as shown in FIG. 3e, a sensor string 105a may be connected to hub 115a and may be provided in a three dimensional spatial arrangement—in this case a helical or spiral shape. The shape may extend across one or more layers of a heap leach or dump. It will be appreciated that any number of different shapes, such as a cube, sphere, tetrahedron or the like may be provided (and connected to one or more hubs) depending on the application and on what is to be measured.

In a further embodiment, as shown in FIG. 3f, a sensor string 105a may be connected to hub 115a and may be provided in a two dimensional spatial arrangement—in this case a web or net arrangement. The shape may extend across one or more layers of a heap leach or dump. It will be appreciated that any number of different shapes may be provided depending on the application and what is to be measured.

Figure 4:
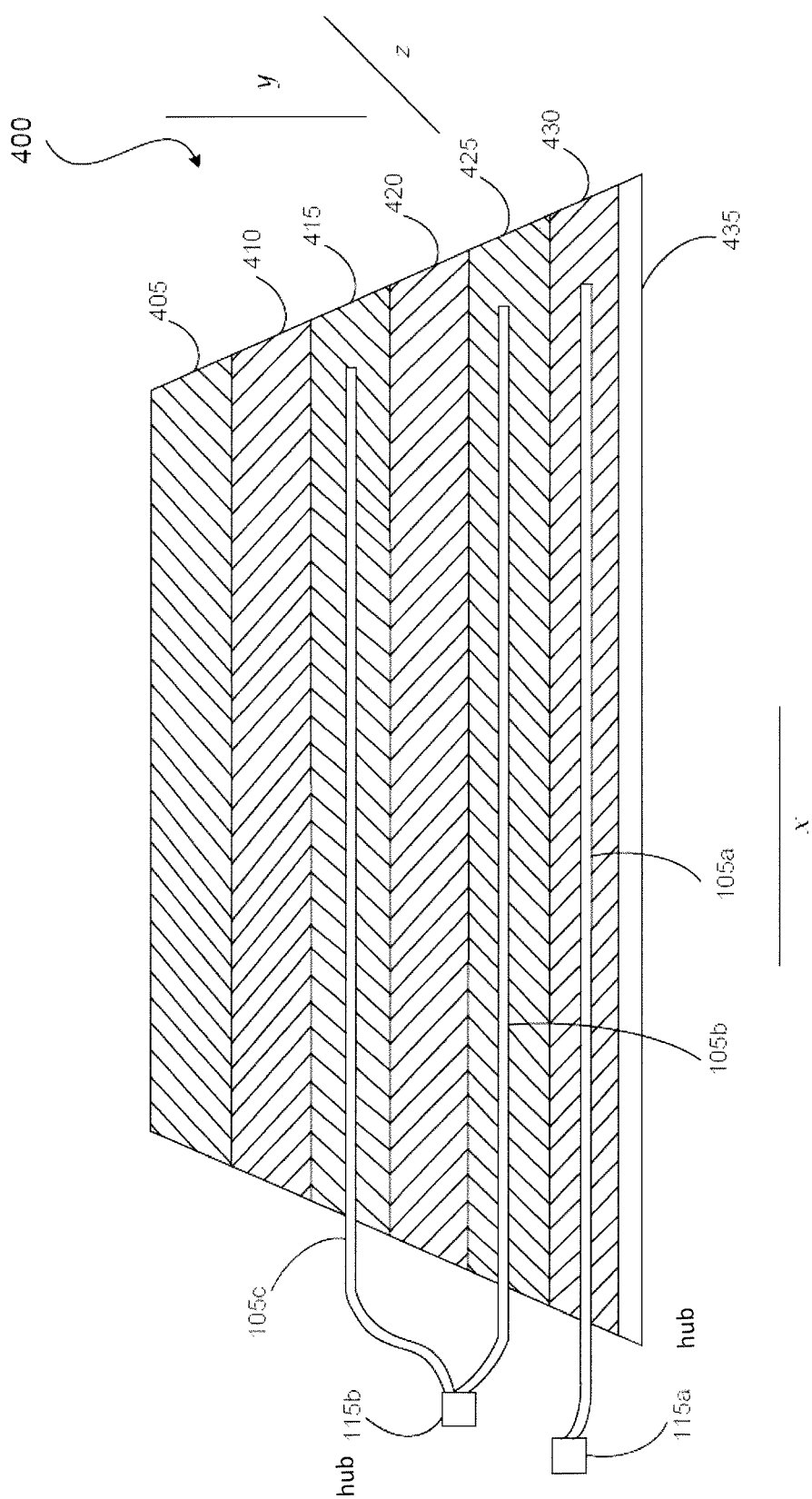
FIG. 4 is a schematic diagram illustrating a preferred embodiment of the invention implemented in a heap leach operation.

FIG. 4 is a schematic diagram of a heap leach arrangement which may be provided in a mining environment. It will be appreciated that the present invention is not limited to this application.

The heap leach 400 includes a number of layers 405, 410, 415, 420, 425 and 430 through which minerals pass after leaching is applied. Also provided is a leaching pad 435 to collect metals from ore or the like. The present invention provides a number of sensor strings 105a, 105b, 105c-105(n) shown extending in both the x and y planes but it will be appreciated that they may also extend in the z plane or be in a two or three dimensional spatial arrangement. Each of the sensor strings are connected to a hub, in which there may be one or more hubs 115a, 115b-115(n) in the complete system. While the present example relates to a heap leach it will be appreciated that the sensors may be placed in any environment and advantageously these sensors may be provided in harsh environments such as bioleaching applications which allows for continuous optimisation of process parameters. In the case of a heap leach these sensors may be provided for continuous monitoring of bioleaching processes which thereby enable spatial monitoring of bioleaching heaps that is to say the heap leach may be monitored in the x, y, and z planes and over a period of time. Advantageously, this provides spatial information about parameters in the region of material to be analysed as well as temporal information. A higher number of sensors may be provided within a particular region of material to be analysed.

It will be appreciated that the arrangement could be provided in other processes including mineral processing, environmental processing for cooling waters, oil and gas extraction processes, food and beverage, manufacturing and waste water treatment. Essentially the present invention provides spatial monitoring over time of a region of material and/or earth to be analysed.

The data acquired by the sensors may then be fed back either manually or automatically to provide an improved system as will be further described with reference to FIGS. 9a to 9g. For example, data obtained from each of the sensors may include the localized position of the sensor, the localized physical parameters like temperature, solution conductivity and chemical information like pH, redox potential, dissolved metals, dissolved oxygen. Further, data obtained and aggregated from each of the sensors over time provides spatial information of a parameter and temporal information of a parameter. This data may be integrated and reported to a monitoring system, and the 3D physical and chemical leaching behaviour will be provided continuously such that it will be possible to check if there is any action needed to optimize the operation by changing physical and chemical conditions (for example the heap engineering, irrigation patterns or other parameters like temperature, pH, adding chemicals, changing chemical concentration, fluid and air flow rate).

Figure 5:
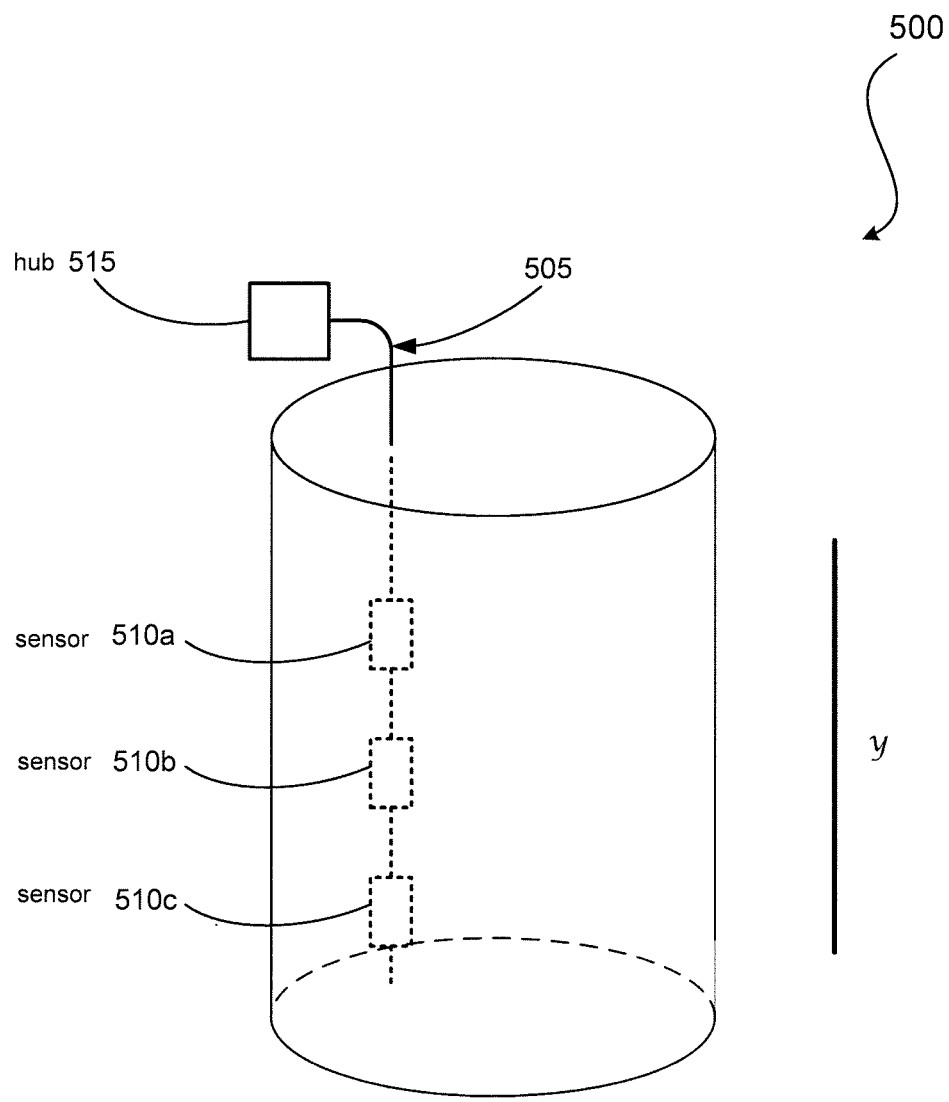
FIG. 5 is a schematic diagram illustrating a preferred embodiment of the invention implemented in a tank heap leach testing environment operation.

FIG. 5 is a schematic diagram illustrating an embodiment of the invention where testing of a heap leach is provided in a tank 500. In a typical tank arrangement, analysis is determined at the bottom of the tank 500 with no information provided about the operation of the heap leach in any other areas.

Advantageously, the present invention provides sensor string 505 having sensors 510a, 510b and 510c in the tank 500. It will be appreciated that any number of sensor strings may be provided and any number of sensors in a string may be provided as necessary. By providing one or more sensors point data from one tank or multiple tanks (or even many points in over process flow) can be obtained and thereby allow to optimization of the end to end process both in terms of throughput and input costs While sensor string 505 is shown along a plane denoted y it will be appreciated that the sensor strings may be positioned in any suitable arrangement to measure parameters of interest in the tank 500. It will also be appreciated that the sensor strings may be provided in two-dimensional spatial arrangements or three-dimensional spatial arrangements such as circular, spiral, zig-zag, and the like.

Also included is a hub 515 which controls the sensor string 505 with the hub 515 connected to the data server 120 (as shown in FIG. 1) by Wi-Fi, 3G, 4G or satellite network depending on what is required in the particular deployment location. The hub 515 is provided with internal memory and may store 14 or more days of data from the sensor strings (in the event that there is an issue with the connection). Data and events received from the sensors 510a, 510b and 510c are preferably timestamped. The hub 515 periodically indicates to the server 120 (as shown in FIG. 1) data via telemetry, the data including, for example, uptime, power supply values and storage available, error data, warning data, informational messages or codes, communication, media information (e.g. RSSI, SINR, RSRQ, etc), any events of sensor string to hub connection or disconnection events including which physical connector on a hub the string sensor is connected to, providing sensor unit metadata for all connected sensor strings and measured sensor data.

Preferably, sensors 510a, 510b and 510c may be measured at 10 minute intervals and data uploaded to the server 120 every 60 minutes. Advantageously, together with the placement of the sensor strings, this provides measurements of parameters of the fluid within a volume of material in a number of dimensions over a period of time-measuring spatial and temporal properties of the parameter.

Advantageously, the present invention allows for spatial and temporal measurement of chemical parameters over a period of time. Various parameters of the tank 500 can then be changed to provide optimal performance. Once optimal performance is achieved, the system can be scaled up to a larger system for further testing such as a crib (as will be described with reference to FIG. 6.

Figure 6:
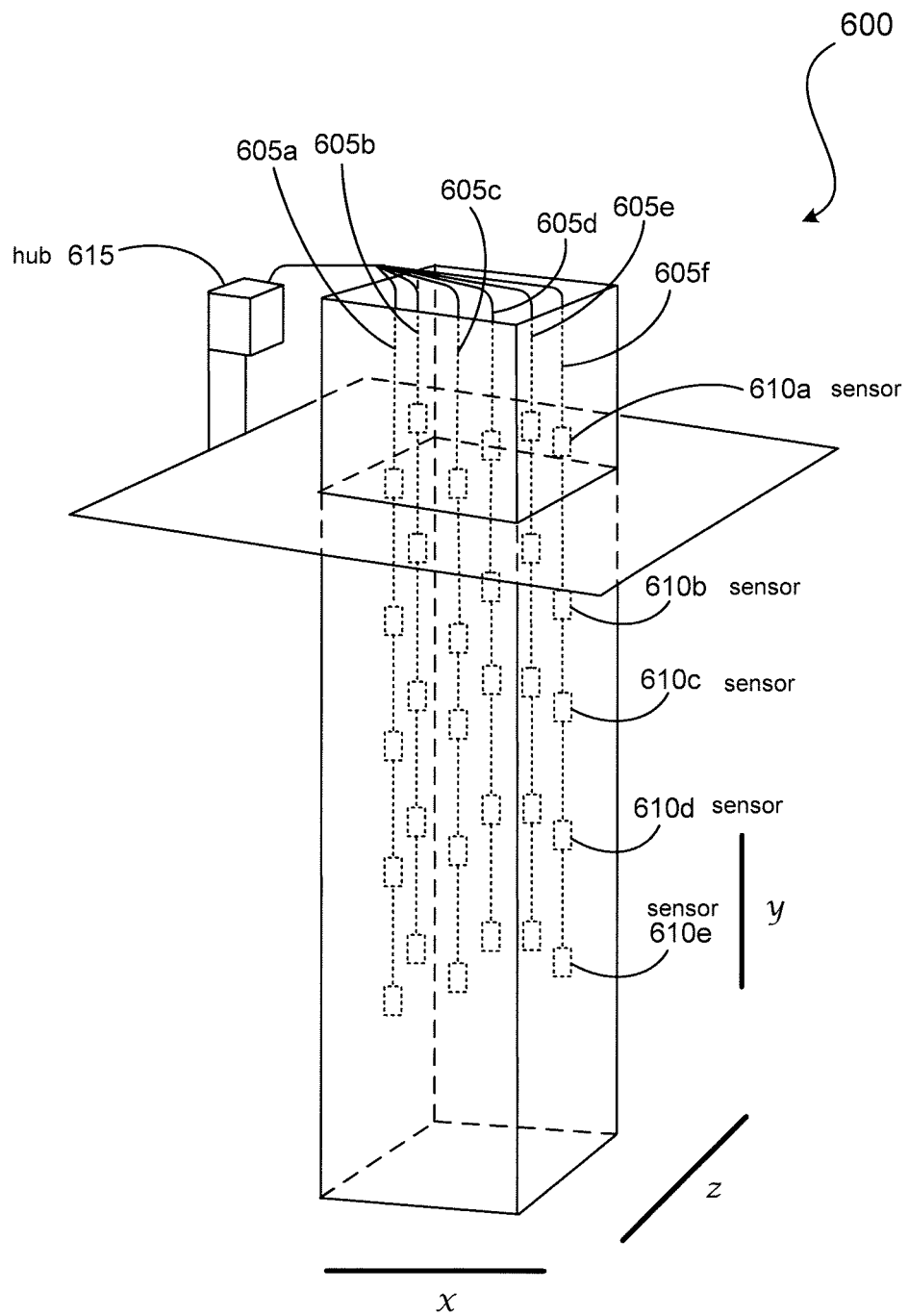
FIG. 6 is a schematic diagram illustrating a preferred embodiment of the invention implemented in a crib heap leach testing environment operation.

FIG. 6 is a schematic diagram illustrating an embodiment of the invention where larger scale testing of a heap leach is provided via one or more cribs 600. In a typical crib arrangement, material to be analysed is determined at the bottom of the crib 600 with no information provided about the operation of the heap leach in any other areas. Advantageously, the present invention provides one or more sensor strings 605a, 605b, 605c, 605d, 605e, 605f having sensors 610a, 610b, 610c, 610d, 610e in the crib 600. It will be appreciated that any number of sensor strings may be provided and any number of sensors in a string may be provided as necessary. While sensor strings 605a, 605b, 605c, 605d, 605e, 605f is shown along planes denoted x, y and z, it will be appreciated that the sensor strings may be positioned in any suitable arrangement to measure, for example, PH levels or the like in the crib 600. It will also be appreciated that the sensor strings may be provided in two-dimensional spatial arrangements or three-dimensional spatial arrangements such as circular, spiral, zig-zag, and the like. Also included is a hub 615 which controls the sensor strings 605a, 605b, 605c, 605d, 605e, 605f with the hub 615 connected to the data server 120 (as shown in FIG. 1) by Wi-Fi, 3G, 4G or satellite network depending on what is required in the particular deployment location. The hub 615 is provided with internal memory and may store 14 or more days of data from the sensor strings (in the event that there is an issue with the connection). Data and events received from the sensors 610a, 610b, 610c, 610d, 610e are preferably timestamped. The hub 615 periodically indicates to the server 120 (as shown in FIG. 1) data via telemetry, the data including, for example, uptime, power supply values and storage available, error data, warning data, informational messages or codes, communication, media information (e.g. RSSI, SINR, RSRQ, etc), any events of sensor string to hub connection or disconnection events including which physical connector on a hub the string sensor is connected to, providing sensor unit metadata for all connected sensor strings and measured sensor data.

Preferably, sensors 610a, 610b, 610c, 610d, 610e may be measured at 10 minute intervals and data uploaded to the server 120 every 60 minutes. Advantageously, together with the placement of the sensor strings, this provides measurements of data both of the fluid within a volume of material in a number of dimensions over a period of time. Advantageously, the present invention allows for spatial measurement of chemical parameters over a period of time. Various parameters of the crib 600 can then be changed to provide optimal performance. Once optimal performance is achieved, the system can be scaled up to a full scale heap leaching operation (as was described with reference to FIG. 4).

Figure 7:
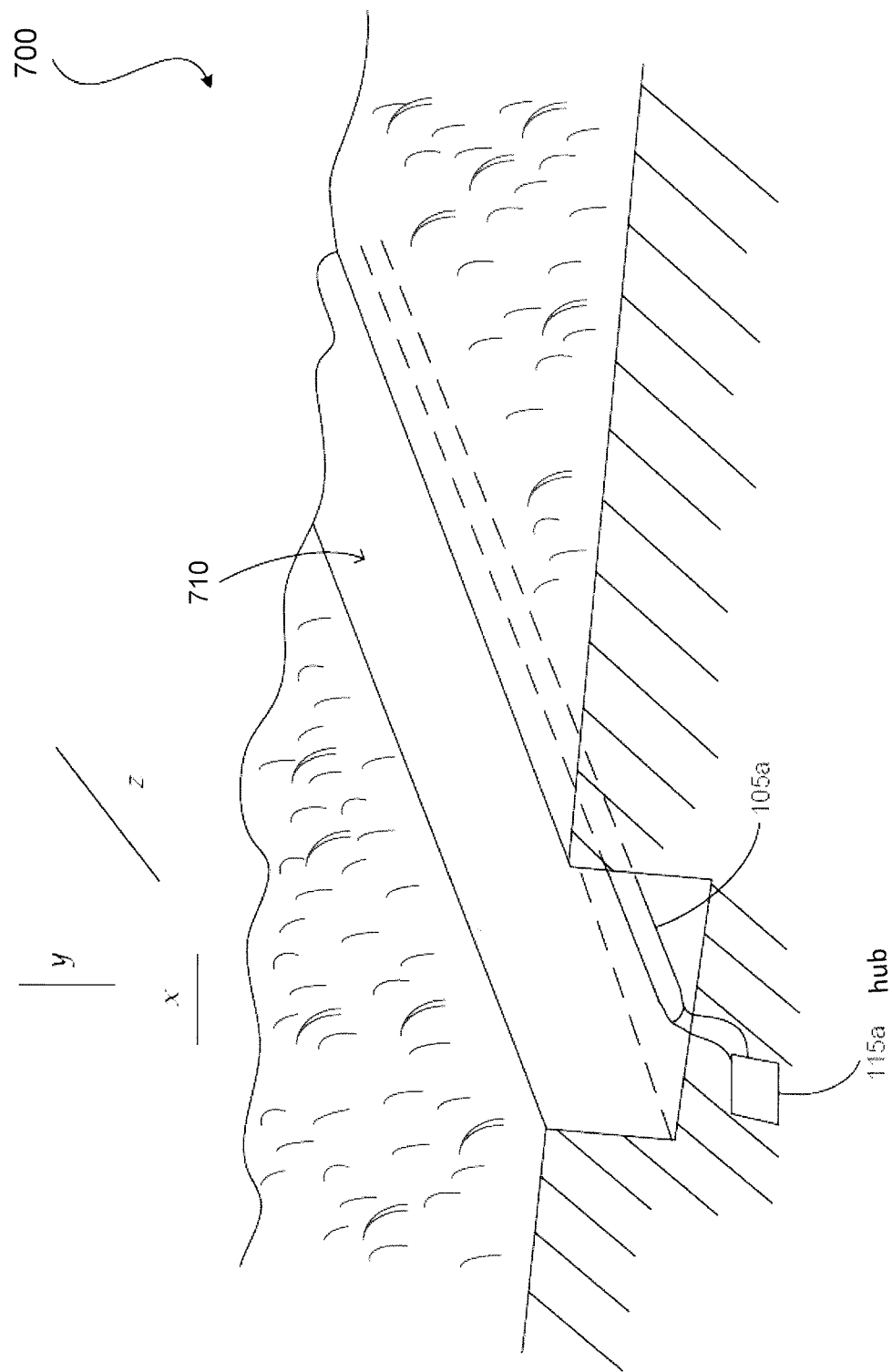
FIG. 7 is a schematic diagram of a preferred embodiment of the invention in use in a trench.

FIG. 7 is a further example of the present invention being provided in an alternative application, namely a trench in a municipal environment 700. A trench 710 may be dug to insert pipework or the like and sensor string 105a may be provided which is connected to hubs 115a to provide spatial information in the earth over time. It will be appreciated that more than one sensor string and/or hub may be provided in the plane x, y or z or be provided in a two or three dimensional spatial arrangement.

Figure 8:
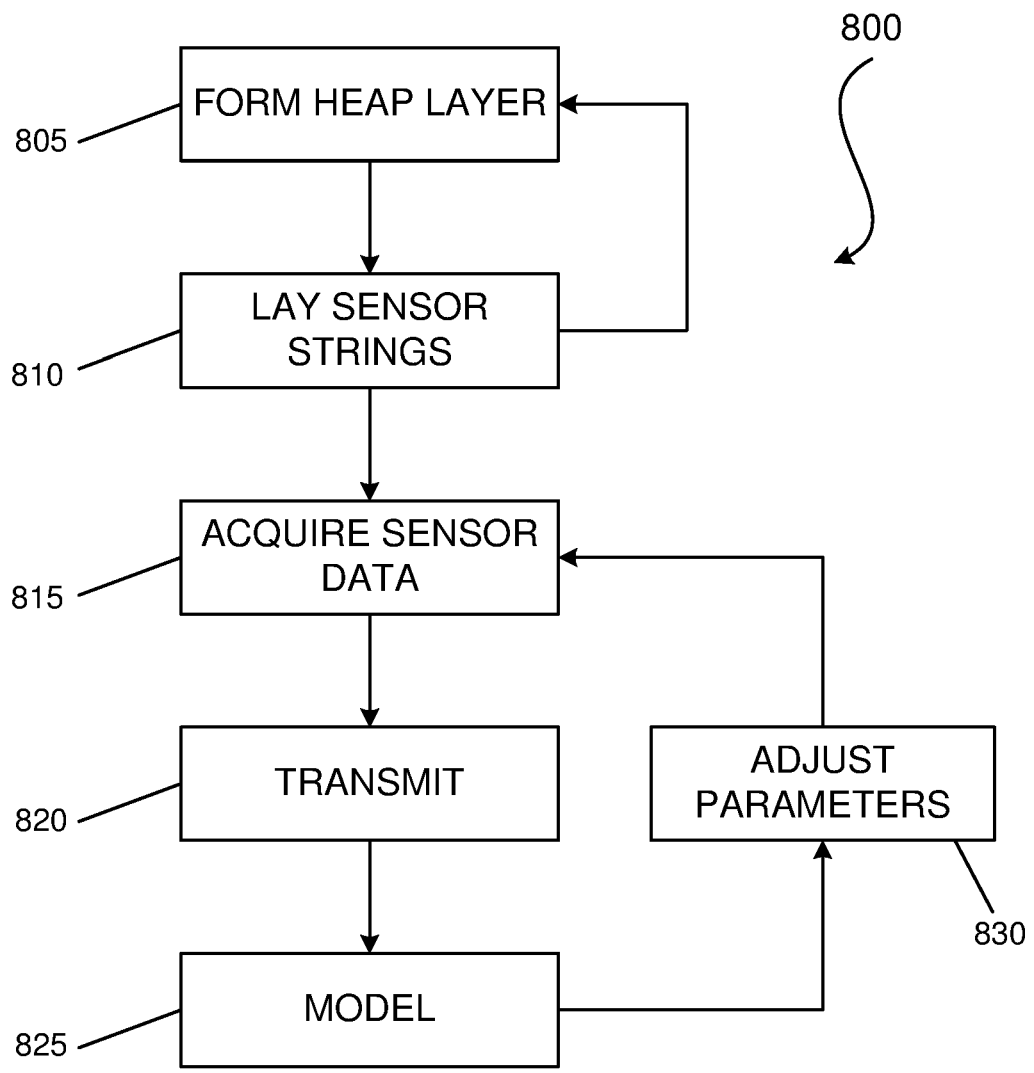
FIG. 8 is a flow diagram illustrating the method according to the present invention.

FIG. 8 is a flow diagram illustrating a method 800 for a method of controlling operation of a leap leach according to the invention. At step 805 a heap leach may be formed by providing one or more heap lift layers. At step 810 one or more sensor strings 105a, 105b, 105c-105(n) are provided in the heap lift layer. The method may return to step 805 where a further layer may be provided over the top of the existing heap lift layer. It will be appreciated that at step 810 a number of layers may be provided with sensor strings throughout x, y and z planes.

At step 815, sensor data from each of the sensor strings 105a, 105b, 105c-105(n) is acquired and then transmitted at step 820 to the hubs 115a to 115(n). At step 825, the sensor data may then be modelled via software residing on the data server 120 or at the hub 115a to 115(n).

Measurement of key process parameters (such as pH) at step 815 provide information read as input to a system model at step 825. The model provides a method by which to translate the information provided by the sensors into actions to be taken to correct or control the operation of the leaching process in order to maintain the process within an acceptable range or to optimise the process towards an objective. The relationship between input data and output control may be considered as a transfer function. Actions taken based on the transfer function of the model at step 830 would be to adjust one or more control parameters, such as to correct or amend parameters such as temperature, chemical parameters, chemical concentrations (acid, for example), liquid and air flow, aeration, spacing for irrigation and the like.

The process of adjustment may be undertaken by manual assessment of the parameters and human-based decisions or automatically by a computerised system. A computerised adjustment system can adjust control parameters based on a fixed transfer function, or the transfer function can adapt itself over time via automated optimisation based on historical and present information about the process. Automatic transfer function adjustment may be provided via machine learning techniques such as for example logistic regression. The effective performance of machine learning techniques is heavily dependent on the availability of detailed, high-fidelity and reliable input data from which the algorithm can learn, such as is provided by the apparatus.

Advantageously, control of these parameters by self-optimising algorithms based on availability of rich data sets allows for improved leaching recovery and efficiency as well as a reduction in consumables (i.e. the materials used in leaching).

Parameters of the individual sensors 110a, 110b, 110c-110(n) may also be adjusted at step 830 to effectively adjust the operation of the heap leach based on the sensor data and the model and action may be taken to correct or amend parameters such as temperature, chemical parameters, chemical concentrations (acid, for example), liquid and air flow, aeration, spacing for irrigation and the like. This may be carried out manually or automatically This may occur over a time period ranging from minutes to hours and typically every one to six hours. Real time data may also be provided depending on the application. Advantageously, control of these parameters allows for improved leaching recovery and efficiency as well as a reduction in consumables (i.e. the materials used in leaching).

While the above method may be applied to a heap leach operation it will be appreciated that the present invention also provides a method which may be provided in other operations for example the method may include acquiring data from a fluid within a volume of material and providing one or more sensor strings 105a, 105b, 105c-105(n) in a region of material to be analysed (each sensor string including a data cable and two or more sensors positioned along that length of the data cable) and the sensors adapted to acquire sensor data in the region of the material surrounding the sensors and to transmit that sensor data via the data cable to one or more hubs where it is then modelled and/or adjusted as per FIG. 8.

With reference FIG. 7, the method may include acquiring data from a fluid within a volume of material and digging a trench in the material to be analysed and providing one or more sensor strings in the trench (each sensor string including a data cable and two or more sensors positioned along the length of the data cable) and the sensors adapted to acquire sensor data in the region of the material in the trench surrounding the sensor and to transmit that sensor data via the data cable to one or more hubs where the data may be modelled and parameters may be adjusted to optimise the system.

FIGS. 9a to 9g are screenshots illustrating software which may reside on the data server 120 or device 130 for processing sensor data and modelling sensor data and adjusting parameters of the sensors via the hub 115a-115(n). The user associated with device 130 may log into the system which may be provided as a "software as a service" type model such that data related to a particular user in a particular organisation is limited. Further, selected members of a particular organisation may be administrators of the system whereas other people within an organisation may have read only access.

Figure 9A:
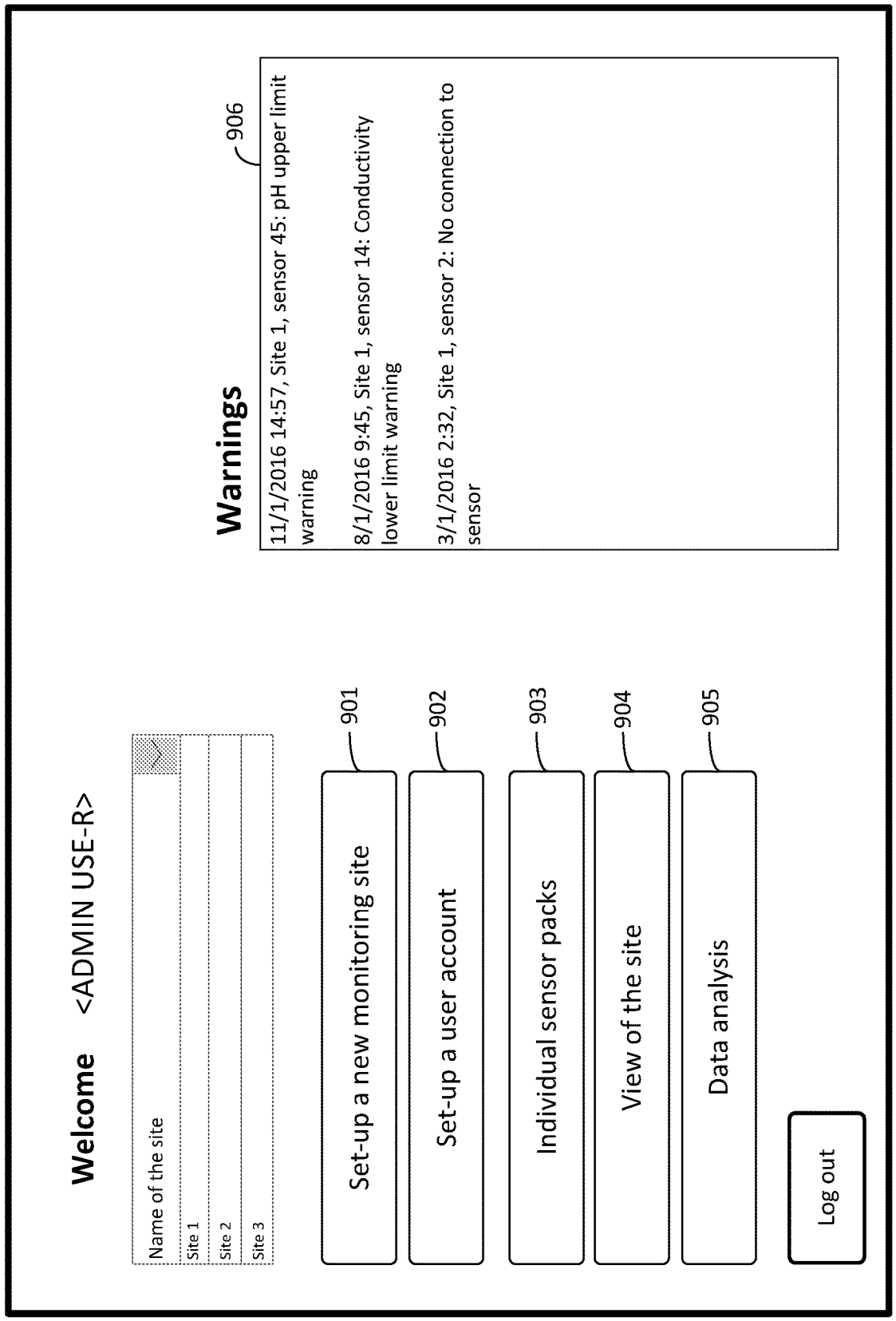

For example, an administrator may be able to set up a new monitoring site and when a sensor string 105a, 105b, 105c-105(n) is activated it may send a unique code to the server 120 to enable identification of the site, the module, hardware and measurement channels in use. As shown in FIG. 9a there are options for setting up a new site 901, setting up a user account 902, viewing individual sensor pack 903, viewing the site 904 and data analysis 905. A warning dialogue box 906 may be provided which can provide warnings in relation to the site sensor associated with the site and/or a parameter associated with the sensor. For example, in FIG. 9a site one sensor 45 has high pH warning from this dialogue box 906 action may be taken by the user. The system may then recommend a change in parameters to correct the pH either automatically or via the user.

FIG. 9b shows a screen shot for setting up a site when, for example an administrator type level user is logged into the system. Where a user can name the monitoring site 907 set the logging frequencies 908, 909 and provide data in relation to the sensor pack 910, also is provided a dialogue box 911 which provides information relating to the site and installed sensor modules and GPS coordinates.

As shown in FIG. 9c detail in relation to the sensor packs may be edited by dialogue box 912 where for each sensor pack the name 913 may be edited the GPS coordinates 914 may be added, the depth 915 of the sensor may be provided as well as GPS tracking 916 of the sensor is provided and whether or not the sensor is in use 917.

FIG. 9d is a screenshot illustrating a dialogue box 918 for calibrating the sensors and the name of the channel 919 may be provided (such as pH, ORP, etc.) together with the unit of measurement (such as mVs, etc.) a regression model may be set at 920 (for example, linear, quadratic, logarithm and the like) temperature setting corrections may be provided as 921, 922 provides calibration terms, 923 provides processing taking place in a regression module (sample time and averaging) and 924 may provide an alarm setting. There is also an option for making the sensor active or inactive, during set-up for example, decommissioning, transition operations or in case of a failure.

Figure 9E:
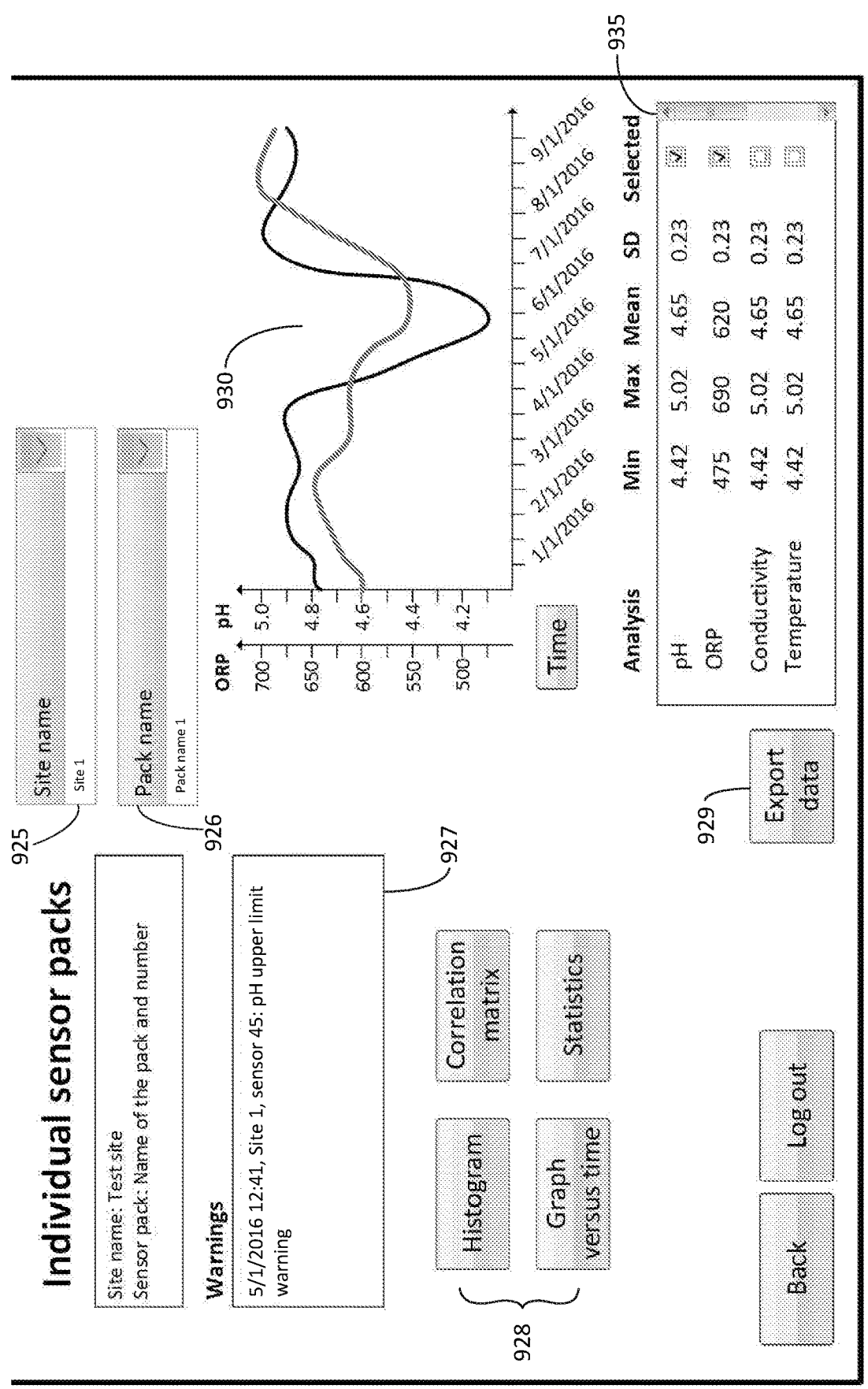

FIG. 9e is a screenshot illustrating where data of the individual sensor modules can be analysed and visualised by a user. It provides general information as to the sensor module and possible warnings 927 the user may select the site the 925 and pack name 926 also provided are options for histogram correlation matrix graph versus time and statistics at 928 this for example could include minimum/maximum, average, standard deviation, range, variance as well as mean and median in relation to the data, a graph 930 is also displayed and the user may select a time range and scale of the various axes, the user may also export the date 929 of a particular time range for export into TXT, CSV, XLS files or the like. Also provided is a table 935 where the user can elect to plot various parameters against each other for example pH, ORP, conductivity and/or temperature.

Figure 9F:
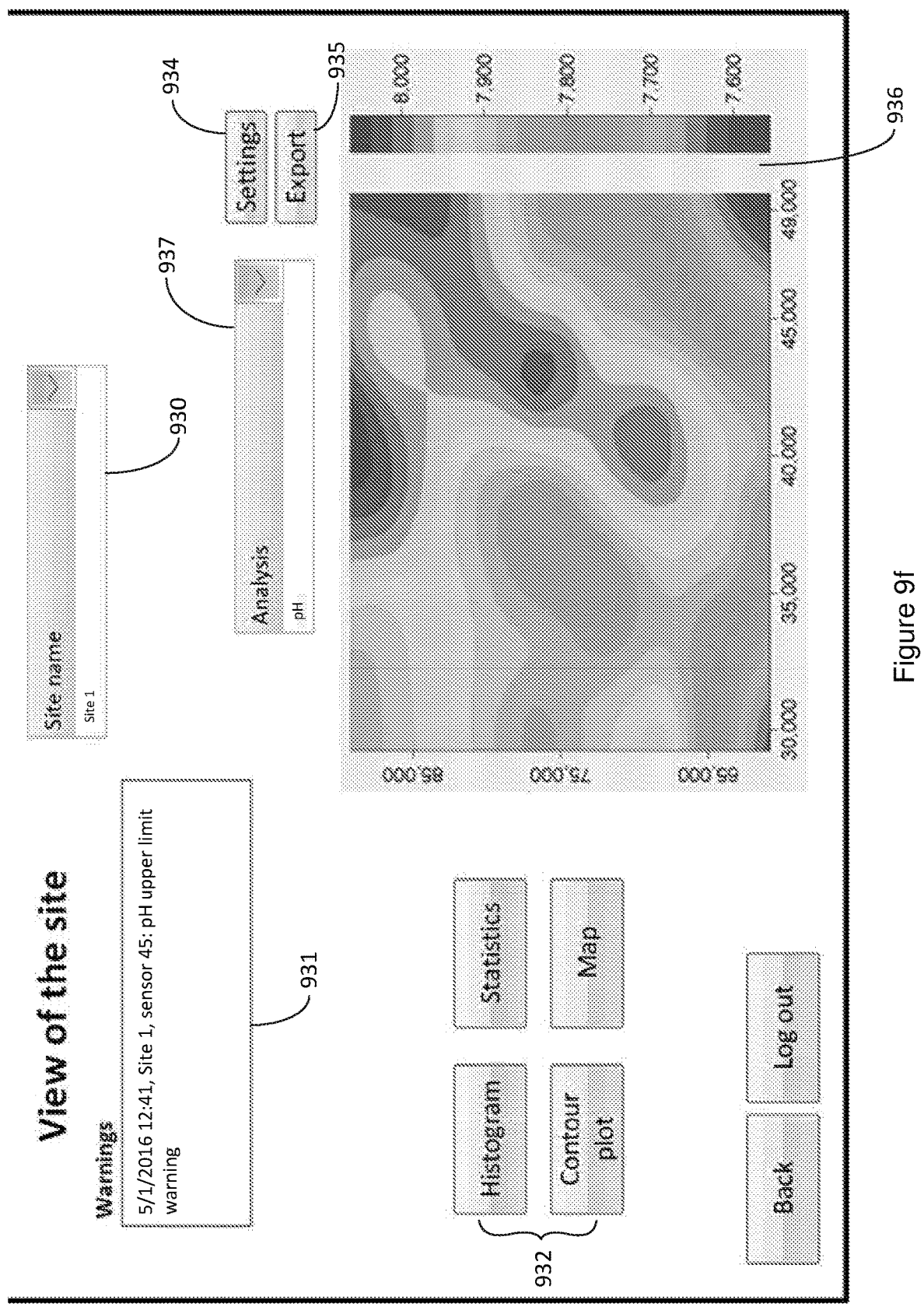

FIG. 9f is a screenshot illustrating the screen presented to the user when they wish to view the site as a whole, warnings may be shown at 931 and a graph is provided 936 which is a contour plot, the user may select a particular type of analysis 937 for example pH, ORP or the like. The data may be exported at 935, histogram, statistics, contour plot or map may be provided by 932, in this case a contour plot is provided, the contour plot shows measurement data plotted over the measurement region.

Figure 9G:
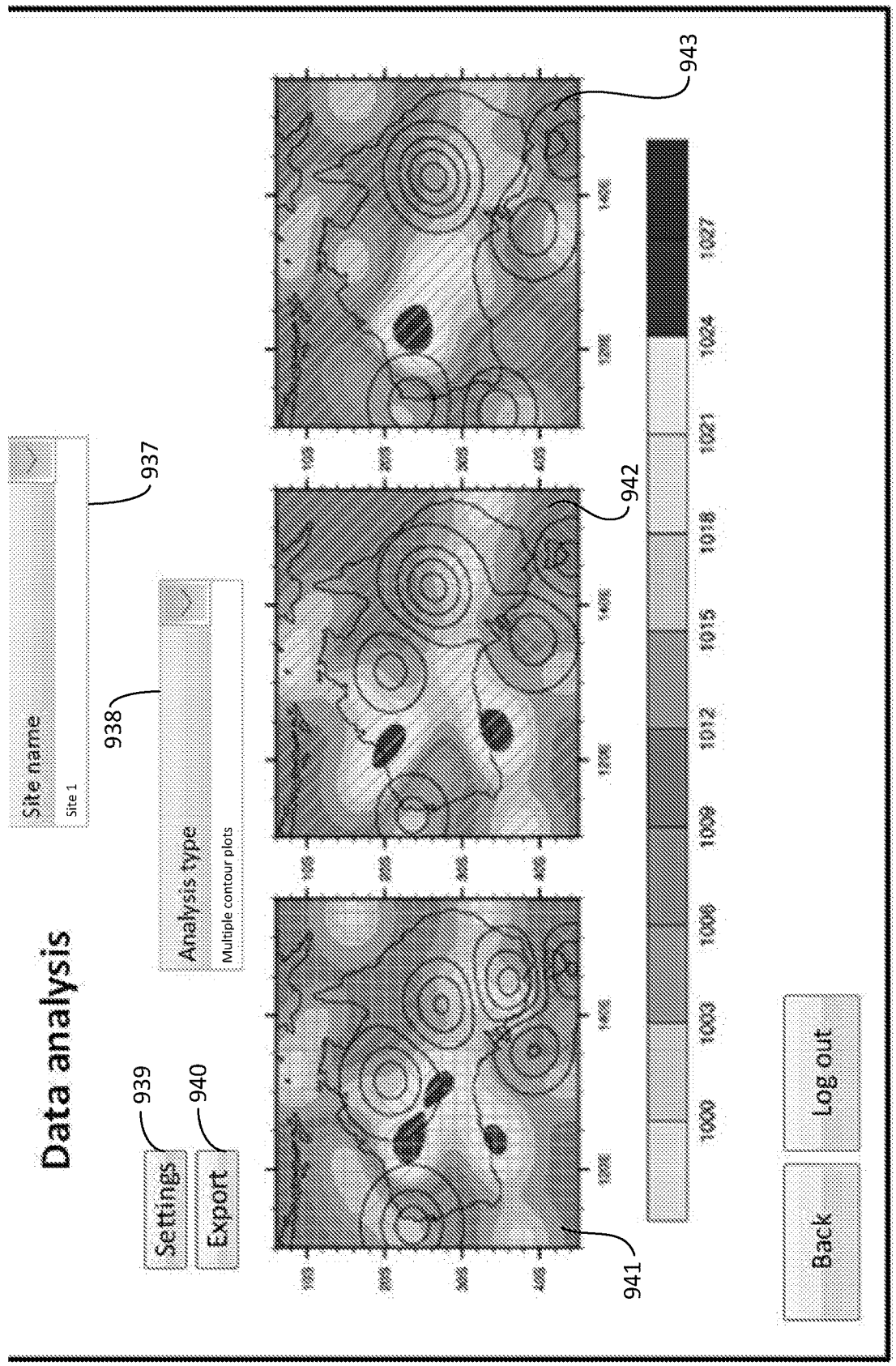

FIG. 9g shows a screenshot for data analysis presented to the user which allows for more sophisticated graphing and data analysis tools. Again, the user may select the site name 937, the analysis type 938, particular settings for the data analysis 939, export of the data analysis 940 and this case three plots 941, 942 and 943 are provided which visualises the data of several parameters, regions or depths. The multi-level contour plots may be stacked in order of depth and a correlation matrix of selected sensor outputs of the selected modules may be provided. The information provided in the screenshots 9d to 9g may allow the user to manually adjust parameters so that operation of the system may be improved (for example in the case of a heap leach).

The claims defining the invention are as follows:

1. An apparatus for use in acquiring electrochemical data from leaching solution within a region of material in a heap leaching application, the apparatus including: one or more sensor strings provided in direct contact with a region of material to be analysed, each sensor string including a data cable and two or more commonly referenced solid-state sensors selected from a wide-band gap semiconductor positioned along the length of the data cable, the two or more commonly referenced solid-state sensors of the one or more sensor strings adapted to periodically acquire spatial and temporal sensor data relating to electrochemical properties of a leaching solution surrounding and in direct contact with the two or more commonly referenced solid-state sensors of the one or more sensor strings over a predetermined period of time and to transmit the sensor data via the data cable to one or more hubs, wherein the apparatus includes one or more solid-state reference electrodes which provide a stable reference potential, and the one or more solid-state reference electrodes are associated with the two or more commonly referenced solid-state sensors of the one or more sensor strings.

2. The apparatus of claim 1, wherein the two or more commonly referenced solid-state sensors of the one or more sensor strings are one or more of potentiometric sensors, amperometric sensors, coulometric sensors, impedimetric sensors and voltammetric sensors.

3. The apparatus of claim 2, wherein the potentiometric sensors are ion-selective electrodes.

4. The apparatus of claim 2, wherein the two or more commonly referenced solid-state sensors of the one or more sensor strings are adapted to provide an output data or data representative of the electrochemical properties of the leaching solution surrounding the two or more commonly referenced solid-state sensors of the one or more sensor strings, the electrochemical properties including one or more of oxidation/reduction potential (ORP), dissolved metal ions, dissolved Oxygen, dissolved $CO_2$, dissolved $H_2S$; and/or concentrations, molarities, potentials or partial pressures of chemical species of interest, or other observable physical or chemical phenomena to transmit an output data to the one or more hubs.

5. The apparatus of claim 2, wherein the two or more commonly referenced solid-state sensors of the one or more sensor strings are adapted to further provide an output data or data representative of one or more of total pressure, flow rate, humidity, electrical resistance, electrical conductivity, permittivity, temperature, or other observable physical phenomena to transmit an output data to the one or more hubs.

6. The apparatus of claim 1, wherein the two or more commonly referenced solid-state sensors of the one or more sensor strings are adapted to provide an output data or data representative of a change over a predetermined time period in the electrochemical properties of the leaching solution surrounding the two or more commonly referenced solid-state sensors of the one or more sensor strings, the electrochemical properties including one or more of oxidation/reduction potential (ORP), dissolved metal ions, dissolved Oxygen, dissolved $CO_2$, dissolved $H_2S$; and/or concentrations, molarities, potentials or partial pressures of chemical species of interest, or other observable physical or chemical phenomena over a predetermined time period to transmit output data to the one or more hubs.

7. The apparatus of claim 1, wherein one or more sensors acquire sensor data relating to electrochemical properties simultaneously.

8. The apparatus of claim 1, wherein one or more sensors acquire sensor data relating to electrochemical properties by way of time-division multiplexing.

9. The apparatus of claim 1, wherein one or more sensor strings are provided in a two-dimensional spatial arrangement.

10. The apparatus of claim 9, wherein the two-dimensional spatial arrangement is an array.

11. The apparatus of claim 1, wherein the one or more sensor strings are provided in a three-dimensional spatial arrangement.

12. The apparatus of claim 11, wherein the three dimensional spatial arrangement is a helix.

13. The apparatus of claim 1, wherein two or more sensor strings are provided in one or more of:
   a first plane,
   a second plane,
   a third plane; or
   both a first and second plane, a first, second and third plane or combination thereof.

14. The apparatus of claim 13, wherein two or more sensor strings are substantially parallel to each other.

15. The apparatus of claim 1, wherein the two or more commonly referenced solid-state sensors of the one or more sensor strings include ion-selective electrodes, voltammetry electrodes, amperometric sensors, and/or spectroscopic techniques.

16. The apparatus of claim 1, wherein the two or more commonly referenced solid-state sensors of the one or more sensor strings are adapted to provide an output data or data representative of a change in one or more of total pressure, flow rate, humidity, electrical resistance, electrical conductivity, permittivity, temperature, or other observable physical phenomena over a predetermined time period to transmit output data to the one or more hubs.

17. The apparatus of claim 16, wherein the output data further includes sensor location ID, unique sensor ID, time stamp and date stamp and localization coordinates.

18. A method of acquiring electrochemical data from leaching solution within a region of material to be analysed, the method including: providing one or more sensor strings in direct contact with a region of material to be analysed, each sensor string including a data cable and two or more commonly referenced solid-state sensors selected from a wide-band gap semiconductor positioned along the length of the data cable, the two or more commonly referenced solid-state sensors of the one or more sensor strings adapted to periodically acquire spatial and temporal sensor data relating to electrochemical properties of leaching solution surrounding and in direct contact with the two or more commonly referenced solid-state sensors of the one or more sensor strings over a predetermined period of time and to transmit the sensor data via the data cable to one or more hubs, wherein the apparatus includes one or more solid-state reference electrodes which provide a stable reference potential, and the one or more solid-state reference electrodes are associated with the two or more commonly referenced sensors of the one or more sensor strings.

19. A method of acquiring electrochemical data from leaching solution within a region of material to be analysed, the method including: digging a trench in the material to be analysed, providing one or more sensor strings in the trench in direct contact with a region of material to be analysed, each sensor string including a data cable and two or more commonly referenced solid-state sensors selected from a wide-band gap semiconductor positioned along the length of the data cable, the two or more commonly referenced solid-state sensors of the one or more sensor strings adapted to periodically acquire spatial and temporal sensor data relating to electrochemical properties of leaching solution surrounding and in direct contact with the two or more commonly referenced solid-state sensors of the one or more sensor strings over a predetermined period of time and to transmit the sensor data via the data cable to one or more hubs, wherein the apparatus includes one or more solid-state reference electrodes which provide a stable reference potential, and the one or more solid-state reference electrodes are associated with the two or more commonly referenced solid-state sensors of the one or more sensor strings.

20. A method of controlling operation of a leach process comprising:
   a) forming a leachable region having one or more layers/dumps;
   b) providing one or more sensor strings within the one or more layers/dumps, and in direct contact with a region of material to be analysed each sensor string including a data cable and two or more commonly-referenced solid-state sensors selected from a wide-band semiconductor positioned along the length of the data cable, the two or more commonly referenced sensors of the one or more sensor strings adapted to periodically acquire spatial and temporal sensor data relating to electrochemical properties of leaching solution surrounding and in direct contact with the two or more commonly referenced sensors of the one or more sensor strings in the layers/dumps over a predetermined period of time and to transmit the sensor data via the data cable to one or more hubs thereby providing sensor data relating to the leach process;
   c) modelling the leach process using the sensor data relating to the leach process; and
   d) adjusting the leach process based on the sensor data relating to the leach process,
   wherein the method includes providing one or more solid-state reference electrodes which can provide a stable reference potential, and the one or more solid-state reference electrodes are associated with the two or more commonly referenced solid state sensors of the one or more sensor strings.

21. The method of claim 20, wherein the one or more sensor strings are provided between the one or more layers/dumps.

22. A system for controlling operation of a leach process comprising:
   a) a leachable region having one or more layers/dumps;
   b) one or more sensor strings provided in the one or more layers/dumps, and in direct contact with a region of material to be analysed each sensor string including a data cable and two or more commonly referenced sensors selected from a wide-band gap semiconductor positioned along the length of the data cable, the two or more sensors of the one or more sensor strings adapted to periodically acquire spatial and temporal sensor data relating to electrochemical properties of leaching solution surrounding and in direct contact with the two or more sensors of the one or more sensor strings in the layers/dumps over a predetermined period of time and to transmit the sensor data via the data cable to one or more hubs thereby providing sensor data relating to the leach process, and
   one or more solid-state reference electrodes which provide a stable reference potential, and the one or more solid-state reference electrodes are associated with the two or more sensors of the one or more sensor strings, and
   c) a computer processor for:
   i. modelling the leach process using the sensor data relating to the leach process and
   ii. adjusting the leach process based on the sensor data relating to the leach process.

* * * * *